US009665096B2

(12) United States Patent
Field et al.

(10) Patent No.: US 9,665,096 B2
(45) Date of Patent: May 30, 2017

(54) MOBILE ROBOT AND METHOD OF OPERATING THEREOF

(71) Applicant: iRobot Corporation, Bedford, MA (US)

(72) Inventors: Timothy G. Field, Bedford, MA (US); David F. Weatherwax, Westford, MA (US); Orin P. F. Hoffman, Somerville, MA (US); Scott R. Lenser, Waltham, MA (US)

(73) Assignee: IROBOT DEFENSE HOLDINGS, INC., Chelmsford, MA (US)

( * ) Notice: Subject to any disclaimer, the term of this patent is extended or adjusted under 35 U.S.C. 154(b) by 0 days.

(21) Appl. No.: 14/830,429

(22) Filed: Aug. 19, 2015

(65) Prior Publication Data

US 2015/0355638 A1 Dec. 10, 2015

Related U.S. Application Data

(62) Division of application No. 13/241,682, filed on Sep. 23, 2011, now Pat. No. 9,146,558.

(Continued)

(51) Int. Cl.
*G05D 1/00* (2006.01)
*G05D 1/02* (2006.01)

(52) U.S. Cl.
CPC ......... *G05D 1/0044* (2013.01); *G05D 1/0088* (2013.01); *G05D 1/027* (2013.01);

(Continued)

(58) Field of Classification Search
CPC . G05D 1/00; G05D 3/00; G01C 19/54; G01C 19/42

(Continued)

(56) References Cited

U.S. PATENT DOCUMENTS 6,263,989 B1 *  7/2001  Won ........................ B25J 5/005
                                                              180/8.7
6,431,296 B1     8/2002  Won (Continued)

OTHER PUBLICATIONS

Office Action for Australian Patent Application No. 2011337055, dated Nov. 1, 2013.

(Continued)

*Primary Examiner* — Thomas G Black
*Assistant Examiner* — Wae Louie
(74) *Attorney, Agent, or Firm* — Jenkins, Wilson, Taylor & Hunt, P.A.

(57) ABSTRACT

A method of operating a mobile robot includes driving the robot according to a drive command issued by a remote operator control unit in communication with the robot, determining a driven path from an origin, and after experiencing a loss of communications with the operator control unit, determining an orientation of the robot. The method further includes executing a self-righting maneuver when the robot is oriented upside down. The self-righting maneuver includes rotating an appendage of the robot from a stowed position alongside a main body of the robot downward and away from the main body, raising and supporting the main body on the appendage, and then further rotating the appendage to drive the upright main body past a vertical position, causing the robot to fall over and thereby invert the main body.

14 Claims, 19 Drawing Sheets

Related U.S. Application Data

(60) Provisional application No. 61/417,964, filed on Nov. 30, 2010.

(52) U.S. Cl.
CPC ......... *G05D 1/0274* (2013.01); *G05D 1/0278* (2013.01); *G05D 2201/0207* (2013.01)

(58) Field of Classification Search
USPC ................ 180/9.1, 9.32; 701/124, 2, 26, 24; 700/254, 264, 245, 262
See application file for complete search history.

(56) References Cited

U.S. PATENT DOCUMENTS

| | | | |
|---|---|---|---|
| 6,651,885 B1 | 11/2003 | Arias | |
| 6,668,951 B2 | 12/2003 | Won | |
| 7,620,477 B2 | 11/2009 | Bruemmer | |
| 2006/0074558 A1 | 4/2006 | Williamson et al. | |
| 2007/0029117 A1* | 2/2007 | Goldenberg | B62D 55/075 180/9.32 |
| 2007/0156286 A1 | 7/2007 | Yamauchi | |
| 2008/0022790 A1* | 1/2008 | Lee | G01C 19/42 74/5.4 |
| 2008/0027590 A1 | 1/2008 | Phillips et al. | |
| 2008/0086241 A1* | 4/2008 | Phillips | G05D 1/0038 701/2 |
| 2008/0277172 A1* | 11/2008 | Ben-Tzvi | B25J 5/005 180/9.1 |
| 2009/0037033 A1* | 2/2009 | Phillips | G05D 1/0088 701/2 |
| 2009/0164045 A1* | 6/2009 | Deguire | G05D 1/0038 700/259 |
| 2010/0066587 A1 | 3/2010 | Yamauchi et al. | |
| 2011/0231050 A1* | 9/2011 | Goulding | B62D 57/024 701/26 |
| 2012/0185091 A1* | 7/2012 | Field | G05D 1/0044 700/254 |
| 2013/0238183 A1* | 9/2013 | Goulding | B62D 57/024 701/26 |
| 2014/0100768 A1* | 4/2014 | Kessens | G05D 3/00 701/124 |
| 2015/0355638 A1* | 12/2015 | Field | G05D 1/0044 700/254 |

OTHER PUBLICATIONS

Office Action for Australian Patent Application No. 2011337055, dated Dec. 5, 2013.
Letter Regarding Office Action for Israel Patent Applicaton No. 223870 (Aug. 20, 2016).
Communication pursuant to Article 94(3) EPC for European Patent Application No. 11 788 274.6 (Aug. 3, 2016).
Merentzev et al., "Vehicular Navigatino in Urban Canyons Using a High Sensitivity GPS Receiver Augmented with a Low Cost Rate Gyro," GPS 2002 Conference (Session E1), pp. 1/7-7/7, XP002667864 (Sep. 24, 2002-Sep. 27, 2002).
Davidson et al., "Using low-cost MEMS 3D accelerometer and one gyro to assist GPS based car navigation system," Proceedings of 15th Saint Petersburg International Conference on Integrated Nagication Systems, pp. 1-9 , XP002667865, (May 26, 2008-May 28, 2008).

\* cited by examiner

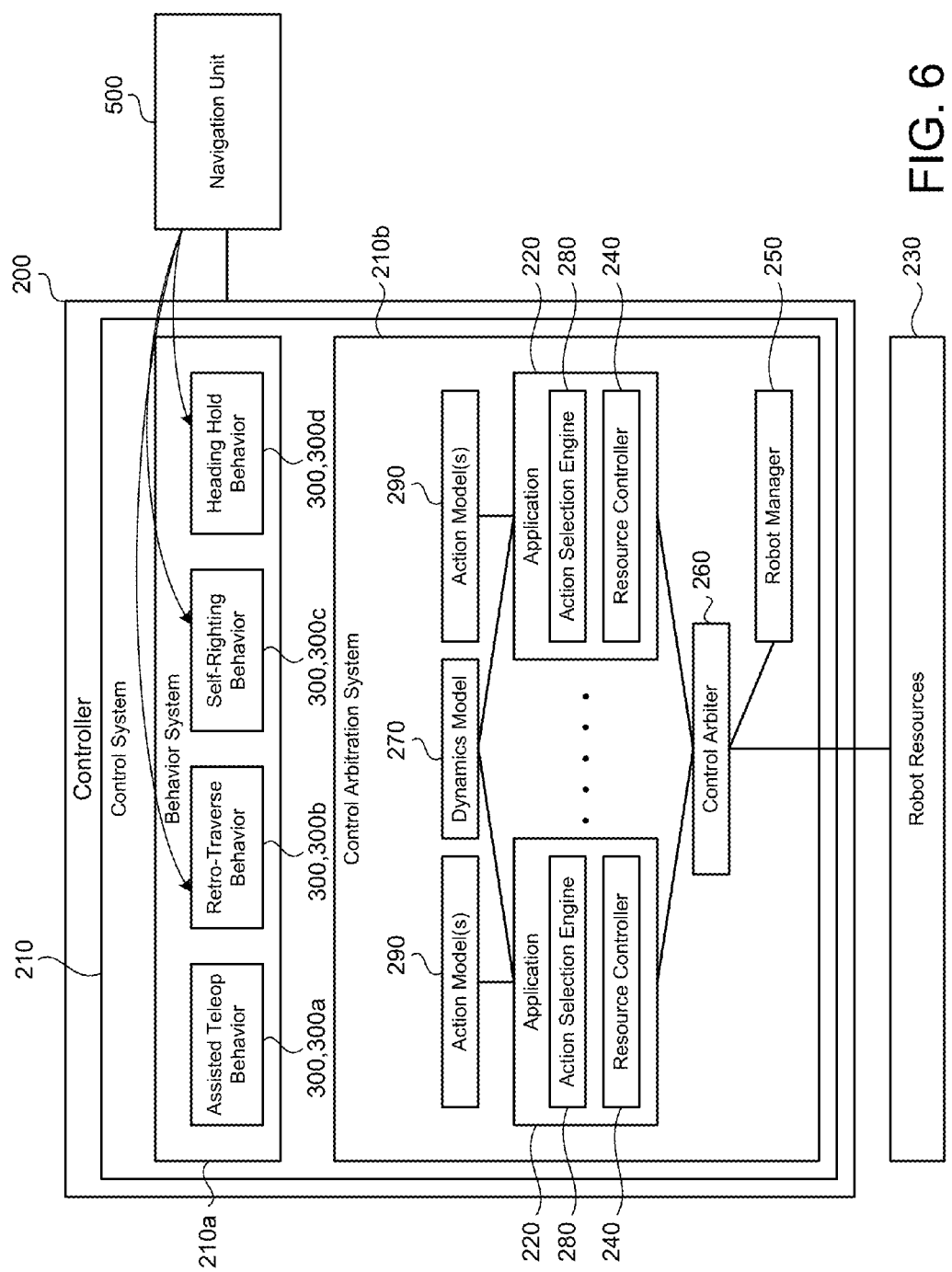

MOBILE ROBOT AND METHOD OF OPERATING THEREOF

CROSS REFERENCE TO RELATED APPLICATIONS

This U.S. patent application is a divisional of, and claims priority under 35 U.S.C. §121 from, U.S. patent application Ser. No. 13/241,682, filed on Sep. 23, 2011, which claims priority under 35 U.S.C. §119(e) to U.S. Provisional Application 61/417,964, filed on Nov. 30, 2010. The disclosures of these prior applications are considered part of the disclosure of this application and are hereby incorporated by reference in their entireties.

TECHNICAL FIELD

This disclosure relates to mobile robots having semi-autonomous capabilities.

BACKGROUND

Robots are useful in a variety of civilian, military, and law enforcement applications. For instance, some robots may inspect or search buildings with structural damage caused by earthquakes, floods, or hurricanes, or inspect buildings or outdoor sites contaminated with radiation, biological agents such as viruses or bacteria, or chemical spills. Some robots carry appropriate sensor systems for inspection or search tasks. Robots designed for military applications may perform operations that are deemed too dangerous for soldiers. For instance, the robot can be used to leverage the effectiveness of a human "point man." Law enforcement applications include reconnaissance, surveillance, bomb disposal and security patrols.

Small, man-portable robots are useful for many applications. Often, robots need to climb stairs or other obstacles. Generally, a small robot must span at least three stair corners to climb stairs effectively, and must have a: center of gravity in a central disposition to maintain climbing stability. When the size or length of a. robot reaches a certain small size relative to the obstacle or stair it must climb, the robot's center of gravity usually has a deleterious effect on climbing ability. What is needed, therefore, is a robot design that can climb obstacles that are large relative to the size of the robot.

Such robots are also employed for applications that require a robot to inspect under and around various objects and surfaces. What is needed, therefore, are robot sensor heads moveable in various degrees of freedom.

SUMMARY

One aspect of the disclosure provides a method of operating a mobile robot. The method includes driving the robot according to a drive direction, determining a driven path of the robot from an origin, and displaying a drive view on a remote operator control unit in communication with the robot. The drive view has a driven path of the robot from the origin. The method further includes obtaining global positioning coordinates of a current location of the robot and displaying a map in the drive view using the global positioning coordinates. The driven path of the robot is displayed on the map.

Implementations of the disclosure may include one or more of the following features. In some implementations, the method includes at least periodically obtaining the global positioning coordinates of the current location of the robot to determine the driven path. The method may include receiving robot position and movement data including gyro data, determining if the robot is at rest, and if at rest, determining a gyro bias. The method may include determining a three-dimensional gravity vector of the robot, determining an ego-motion estimate of the robot based at least in part on the three-dimensional gravity vector, gyro bias, and gyro data, and determining a robot global position by combining the ego-motion estimate and the global positioning coordinates of the robot. In some examples, the robot position and movement data includes gyro data, including a robot angular rate and a robot acceleration, robot odometry, and global positioning coordinates of the robot. Determining the ego-motion estimate of the robot may be based at least in part on odometry. Moreover, a Kalman filter may be used to determine the three-dimensional gravity vector of the robot. In some examples, the method includes using a particle filter to determine the robot global position.

In some implementations, the method includes at least periodically receiving the robot global position in the remote operator control unit and connecting the sequentially received robot global positions with a displayed line. The driven path of the robot may be determined before obtaining the global positioning coordinates and displaying the driven path in the drive view. The method may include determining the driven path of the robot during a loss of communication with a satellite for obtaining the global positioning coordinates and displaying the driven path in the drive view.

The method may include determining the driven path of the robot using at least one of an inertial measurement unit, odometry, and dead reckoning. After experiencing a loss of communications with the operator control unit, the method may include determining a retro-traverse drive command to maneuver the robot along a path back to a communication location where the robot had established communications with the operator control unit and driving the robot according to the determined retro-traverse drive command. The path back to the communication location may coincide at least in part with a portion of the driven path. Moreover, the method may include displaying a heading of the robot in the drive view.

Another aspect of the disclosure provides another method of operating a mobile robot. The method includes driving the robot according to a drive command issued by a remote operator control unit in communication with the robot, determining a driven path of the robot from an origin, and after experiencing a loss of communications with the operator control unit, determining a retro-traverse drive command to maneuver the robot along a return path back to a communication location where the robot had established communications with the operator control unit. The method also includes driving the robot according to the determined retro-traverse drive command.

Implementations of the disclosure may include one or more of the following features. In some implementations, the method includes at least periodically obtaining global positioning coordinates of a current location of the robot to determine the driven path. The return path back to the communication location may coincide at least in part with a portion of the driven path. The method may include storing the determined driven path in memory and continuously removing a portion of the determined driven path from the memory corresponding to the return path back to the communication location. Moreover, the method may include ceasing driving the robot according to the determined retro-traverse drive command when the robot is within a threshold distance of the operator control unit. In some examples, the method includes displaying a drive view on the remote operator control unit in communication with the robot, the drive view having the driven path of the robot from the origin.

In some implementations, the method includes obtaining global positioning coordinates of a current location of the robot and displaying a map in the drive view using the global positioning coordinates, the driven path of the robot displayed on the map. The method may include receiving robot position and movement data including gyro data, determining if the robot is at rest, and if at rest, determining a gyro bias. The method may include determining a three-dimensional gravity vector of the robot, determining an ego-motion estimate of the robot based at least in part on the three-dimensional gravity vector, gyro bias, and gyro data, and determining a robot global position by combining the ego-motion estimate and the global positioning coordinates of the robot. In some examples, the robot position and movement data includes gyro data, including a robot angular rate and a robot acceleration, robot odometry, and global positioning coordinates of the robot. Determining the ego-motion estimate of the robot may be based at least in part on odometry. Moreover, a Kalman filter may be used to determine the three-dimensional gravity vector of the robot. In some examples, the method includes using a particle filter to determine the robot global position. The method may include at least periodically receiving the robot global position in the remote operator control unit and connecting the sequentially received robot global positions with a displayed line.

In yet another aspect, a method of operating a mobile robot includes driving the robot according to a drive command issued by a remote operator control unit in communication with the robot, determining a driven path from an origin, and after experiencing a loss of communications with the operator control unit, determining an orientation of the robot. The method further includes executing a self-righting maneuver when the robot is oriented upside down. The self-righting maneuver includes rotating an appendage of the robot from a stowed position along side a main body of the robot downward and away from the main body, raising and supporting the main body on the appendage, and then further rotating the appendage to drive the upright main body past a vertical position, causing the robot to fall over and thereby invert the main body.

Implementations of the disclosure may include one or more of the following features. In some implementations, the appendage includes at least one flipper rotatably mounted near one end of the main body of the robot. The flipper can rotate in a continuous 360 degrees with respect to the main body. The method may include moving each arm attached to the main body to place its respective center gravity in a position that maintain an overall center of gravity of the robot within the envelope of the 360 degree rotation of the at least one flipper.

Another aspect of the disclosure provides a method of operating a mobile robot that includes driving the robot according to a heading issued by a remote operator control unit in communication with the robot and upon detecting a deviation between a drive heading of the robot and the issued heading, determining a heading correction. The method further includes driving the robot according to the determined heading correction until the drive heading matches the issued heading.

In some implementations, the method includes displaying a drive view on the remote operator control unit. The drive view shows a driven path of the robot from an origin and the heading of the robot. The method may include obtaining global positioning coordinates of a current location of the robot and displaying a map in the drive view using the global positioning coordinates, the driven path of the robot displayed on the map.

In some implementations, the method includes receiving robot position and movement data including gyro data, determining if the robot is at rest, and if at rest, determining a gyro bias. The method may include determining a three-dimensional gravity vector of the robot, determining an ego-motion estimate of the robot based at least in part on the three-dimensional gravity vector, gyro bias, and gyro data, and determining a robot global position by combining the ego-motion estimate and the global positioning coordinates of the robot. In some examples, the robot position and movement data includes gyro data, including a robot angular rate and a robot acceleration, robot odometry, and global positioning coordinates of the robot. Determining the ego-motion estimate of the robot may be based at least in part on odometry. Moreover, a Kalman filter may be used to determine the three-dimensional gravity vector of the robot. In some examples, the method includes using a particle filter to determine the robot global position. The method may include at least periodically receiving the robot global position in the remote operator control unit and connecting the sequentially received robot global positions with a displayed line.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 6 is a schematic view of an exemplary controller having a control system.

Like reference symbols in the various drawings indicate like elements.

DETAILED DESCRIPTION

Figure 1:
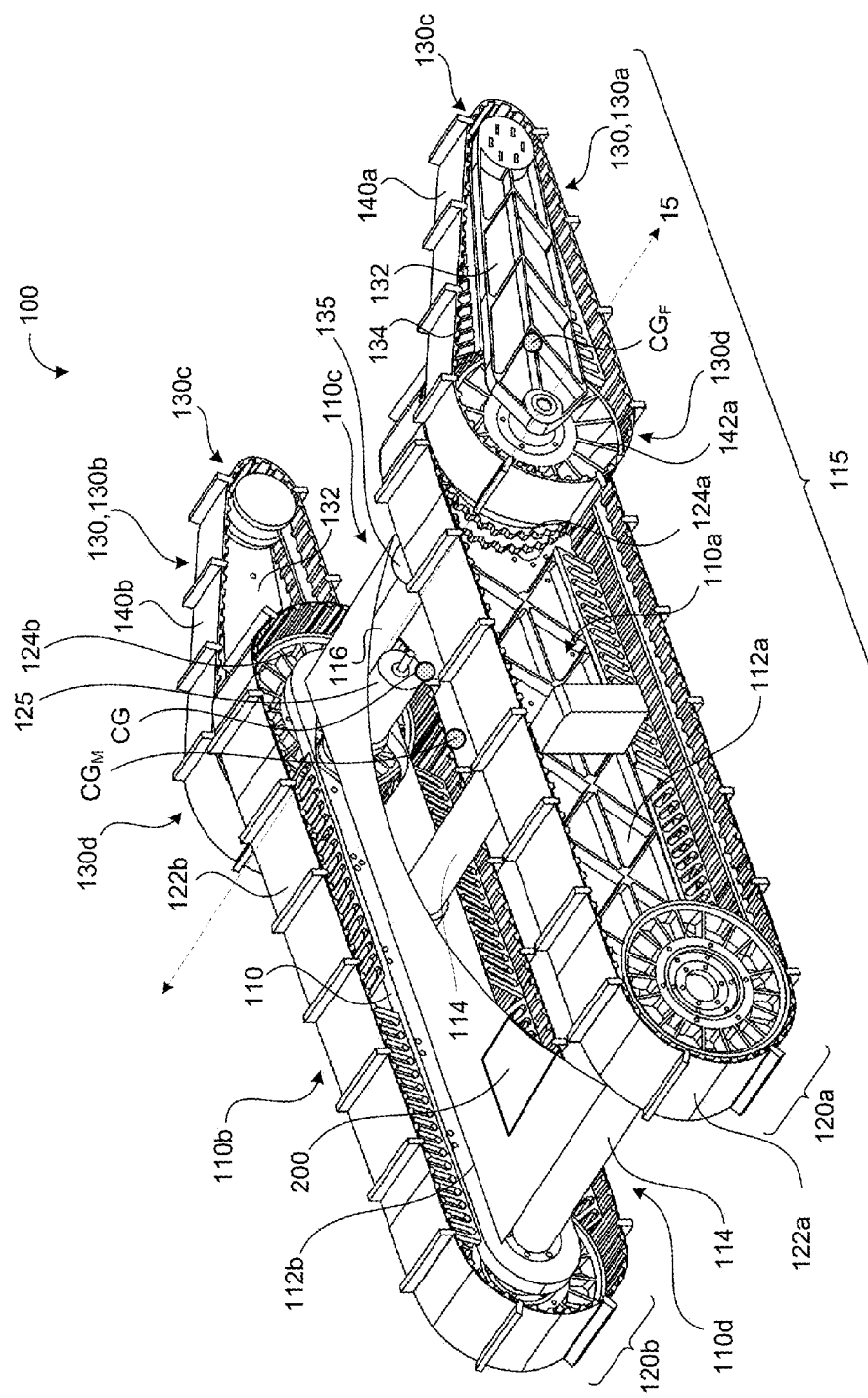
FIG. 1 is a rear perspective view of an exemplary robot.

Mobile robots having semi-autonomous capabilities can perform a wider variety of missions as compared to robots with no semi-autonomous or autonomous capabilities. For example, a mobile robot having semi-autonomous capabilities may navigate or traverse a surface in an autonomous fashion while experiencing a loss of communications with a remote operator control unit (OCU) and navigate to regain communications.

An exemplary robotic vehicle or robot 100 that includes or receives and communicates with a navigation payload that provides semi-autonomous capabilities is shown in FIGS. 1-4. Although the robot 100 shown includes a track driven drive system having flippers, other mobility platforms, configurations and morphologies are possible as well, such as wheel driven platforms, crawling or walking platforms, etc. The robot 100 can be designed to move about in a variety of environments, including an urban environment of buildings (including staircases), streets, underground tunnels, building ruble, and in vegetation, such as through grass and around trees. The robot 100 may have a variety of features which provide robust operation in these environments, including impact resistance, tolerance of debris entrainment, and invertible operability.

Examples of various tracked robotic vehicles or robots are shown and described in U.S. Pat. Nos. 6,431,296, 6,263,989, 6,668,951 and 6,651,885. The disclosures of these patents are considered part of the disclosure of this application and are hereby incorporated by reference in their entireties. The aforementioned patents describe the construction of various tracked robotic vehicles having driven flippers and articulated robotic components.

Referring to FIG. 1-4, the robot 100 includes a main body 110 (or chassis) having a drive system 115 supported by the main body 110. The main body 110 has right and left sides 110a, 110b as well as a leading end 110c, a trailing end 110d and a center of gravity $CG_M$. In the example shown, the main body 110 includes right and left rigid side plates 112a, 112b disposed parallel to each other. At least one transverse support 114 rigidly couples the right side plate 112a to the left side plate 112b. In the example shown in FIG. 1, an articulator shaft 116 at the leading end 110c of the main body provides additional transverse support between the right and left side plates 112a, 112b. The rigid components are designed for strength and low weight and can be made from a material such as 7075-T6 aluminum. Alternative versions of the robot 100 can use other materials, such as other lightweight metals, polymers, or composite materials. The robot 100 may be electrically powered (e.g. by a bank of standard military BB-2590 replaceable and rechargeable lithium-ion batteries).

In some implementations, the drive system 115 includes right and left driven track assemblies 120a, 120b mounted on the corresponding right and left sides 110a, 110b of the main body 110 and having right and left driven tracks, 122a and 122b respectively. Each driven track 122a, 122b is trained about a corresponding front wheel, 124a, 124b, which rotates about a drive axis 15. Although the robot 100 is depicted as having skid steer driven tracks, other drive systems are possible as well, such as differentially driven wheels, articulated legs, etc.

Figure 2:
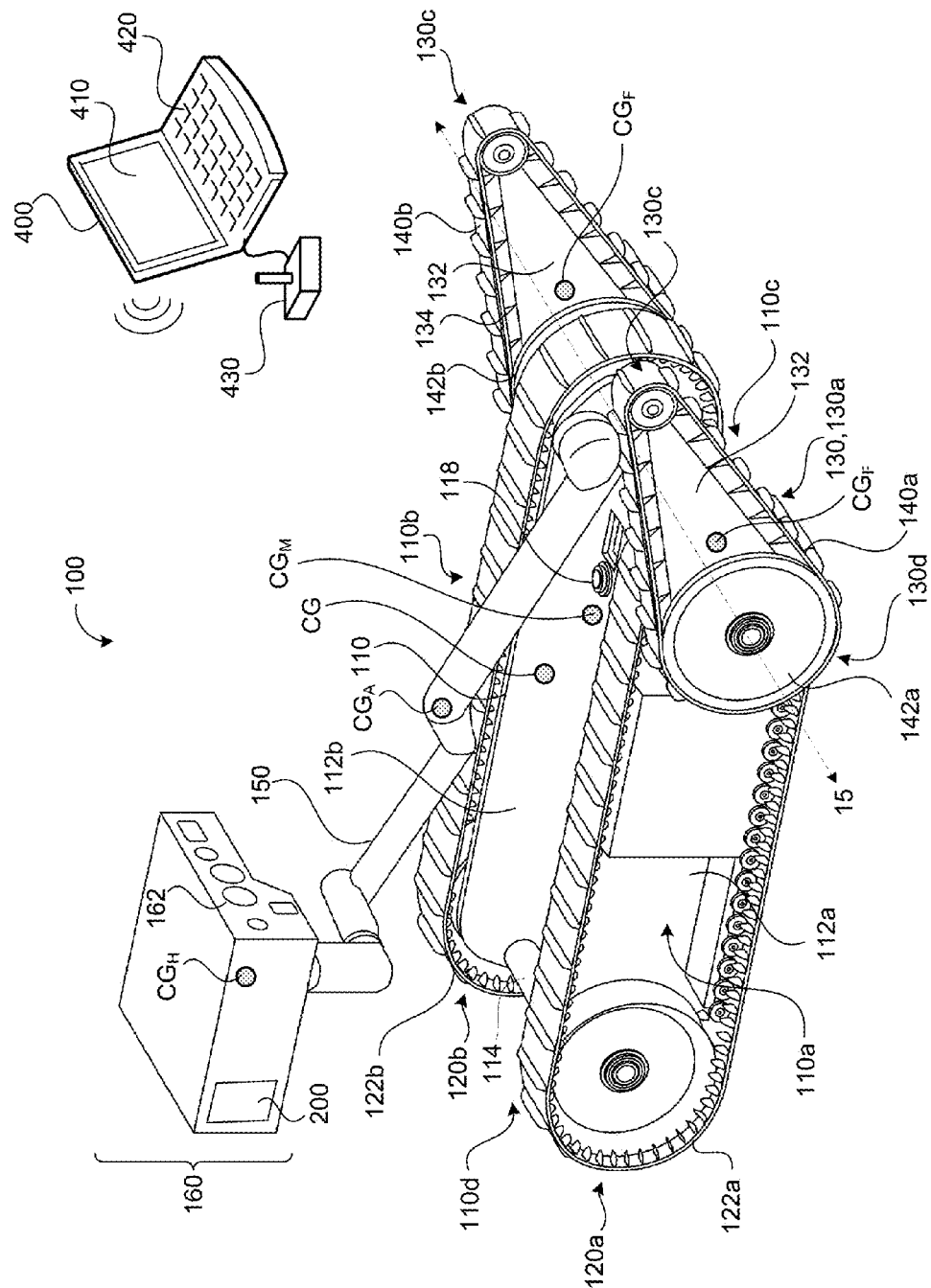
FIG. 2 is a front perspective view of an exemplary robot.

In the examples shown in FIGS. 1 and 2, the robot 100 includes at least one extendable flipper 130 mounted on the main body 110. In the examples shown in FIGS. 3 and 4, the robot 100 is depicted without any flippers 130, but may be configured to releasable receive one or more flippers 130 onto the main body 110 (e.g., onto and concentric with one of the front drive wheels 124a, 124b at the leading end 110c of the main body 110). Referring again to FIGS. 1 and 2, the robot 100 includes right and left flippers 130a, 130b, which are shown in a fully extended configuration extending beyond the front or leading end 110c of the main body 110. The flippers 130, 130a, 130b each have a distal end 130c, a pivot end 130d, and a flipper center of gravity $CG_F$ between the distal and pivot ends 130c, 130d. Each flipper 130, 130a, 130b pivots about a drive axis 15 near the leading end 110c of the main body 110. Moreover, each flipper 130a, 130b may have a driven flipper track 140a, 140b trained about flipper drive wheel 142a, 142b, which is driven about the drive axis 15 at the pivot end 130d of the flipper 130a, 130b. In the example shown, flipper track supports 134 disposed on a flipper side plate 132 of the flipper 130 support the flipper track 120. In some implementations, the flippers 130, 130a, 130b can be rotated in unison in a continuous 360 degrees between a stowed position, in which the flippers 130a, 130b are next to the right and left side plates 112a, 112b of the main body 110, and at least one deployed position, in which the flippers 130a, 130b are pivoted at an angle with respect to the main tracks 122a, 122b. The center of gravity CG of the robot 100 can be contained within an envelope of the 360 degree rotation of the flippers 130a, 130b.

In some implementations, the flipper side plates 132 of the respective right and left flippers 130a, 130b are rigidly coupled to one another through the articulator shaft 116 to move together in unison. In other implementations, the flippers 130a, 130b pivot independently of each other. The combination of main tracks assemblies 120a, 120b and flippers 130, 130a, 130b provide an extendable drive base length to negotiate gaps in a supporting surface. In some examples, the right main tack 122a and the right flipper track 140a are driven in unison and the left main tack 122b and the left flipper track 140b are driven in unison to provide a skid steer drive system.

In the example shown in FIG. 2, the main body 110 includes a camera 118 disposed near the leading end 110c of the main body 110 and may be positioned to have a field of view directed forward and/or upward. The robot 100 may include one or more arms 150 (e.g., articulated arms) each having a pivot end 150c pivotally coupled to the main body 110 and a distal end 150d that may be configured to receive a head 160 or a gripper 170. In the example shown in FIG. 2, the robot includes one arm 150 having a head 160 (e.g., a sensor head) mounted at the distal end 150d of the arm 150. The arm 150 has an arm center of gravity $CG_A$ and the head 160 has a center of gravity $CG_H$. The head 160 may include a camera 162 (e.g., visible light and/or infrared camera), radar, LIDAR (Light Detection And Ranging, which can entail optical remote sensing that measures properties of scattered light to find range and/or other information of a distant target), LADAR (Laser Detection and Ranging), a communication device (radio frequency, wireless, etc.), and/or other components.

Figure 3:
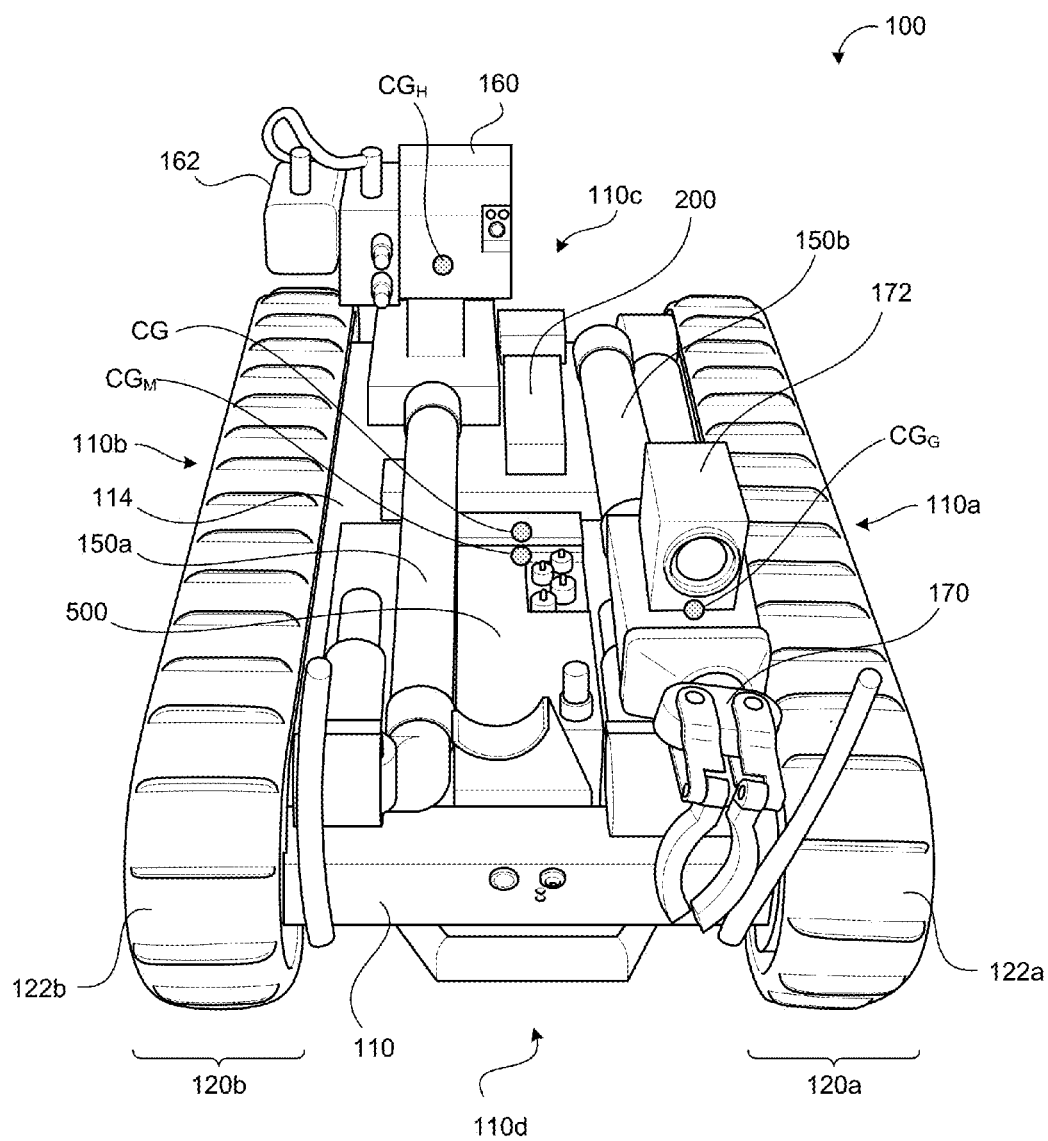
FIG. 3 is a rear view of an exemplary robot.
Figure 4:
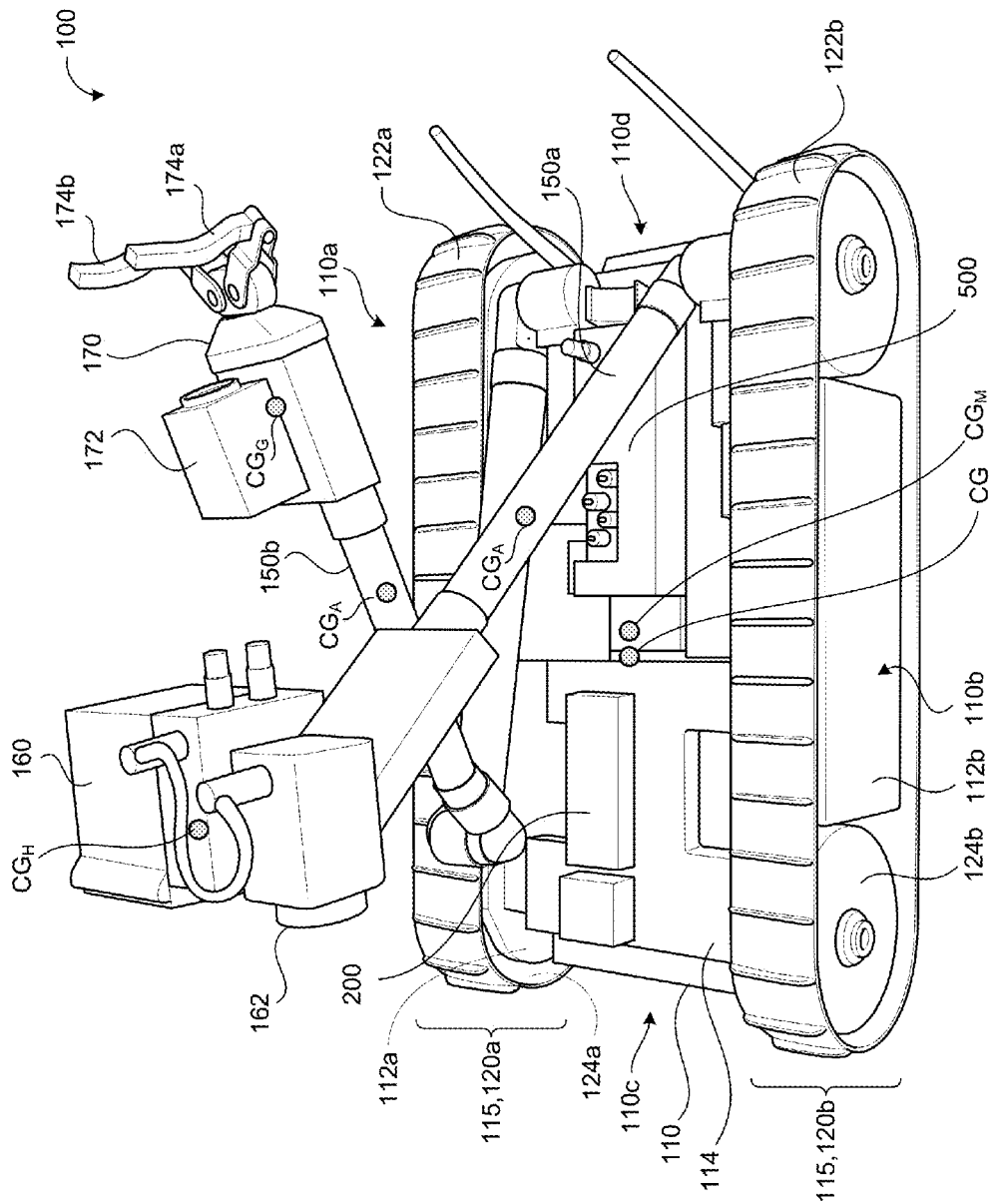
FIG. 4 is a side perspective view of an exemplary robot.

In the examples shown in FIGS. 3 and 4, the robot 100 includes first and second arms 150a, 150b each having a pivot end 150c pivotally coupled to the main body 110. Although the pivot end 150c of the first arm 150a is shown attached near the trailing end 110d of the main body 110 and the pivot end 150c of the second arm 150b is shown attached near the leading end 110c of the main body 110, both arms 150a, 150b may be attached at a common location or region of the main body 110. By having the arms 150a, 150b coupled to the main body 110 at opposite ends, the arms 150a, 150b can be stowed along the main body 110 in a compact configuration and pivot in opposite directions away from main body 110 to allow a wider range of CG-shifting, for example, to negotiate obstacles. A head 160 is mounted on the distal end 150d of the first arm 150a and a gripper 170 is mounted on the distal end 150d of the second arm 150b. In the example shown, the gripper 170 includes a gripper camera 172 and first and second opposing fingers or tongs 174a, 174b for grasping objects.

In some implementations, the robot 100 includes a controller 200 in communication with the drive system 115 and any arm(s) 150, 150a, 150b and head(s) 160 or gripper(s) 170 mounted on the arm(s) 150, 150a, 150b. The controller 200 may issue drive commands to one or more motors 125 driving the main tracks 120 and the flipper tracks 140. Moreover, the controller 200 may issue rotational commands a flipper motor 135 to rotate the flippers 130 about the drive axis 15. The controller 200 may include one or more computer processors and associated memory systems.

Referring again to FIG. 2, the controller 200 of the robot 100 may include a communication system, which includes, for example, a radio to communicate with a remote operator control unit (OCU) 400 to receive commands and issue status and/or navigation information. The OCU 400 may include a display (e.g., LCD or touch screen) 410, a keyboard 420, and one or more auxiliary user inputs 430, such a joystick or gaming unit. The OCU 400 allows an operator or user to control the robot 100 from a distance. In some examples, the user can select different levels of human control over the robot 100, ranging from a teleoperation mode, in which the user directly controls the motors and actuators on the robot 100, to autonomous operation, in which the user passes higher-level commands to the robot 100. In partially autonomous operation, the robot 100 can perform tasks such as following a perimeter or wall, recovering from getting stuck in an opening or due to high centering on an obstruction, evading a moving object, or seeking light.

Figure 5A:
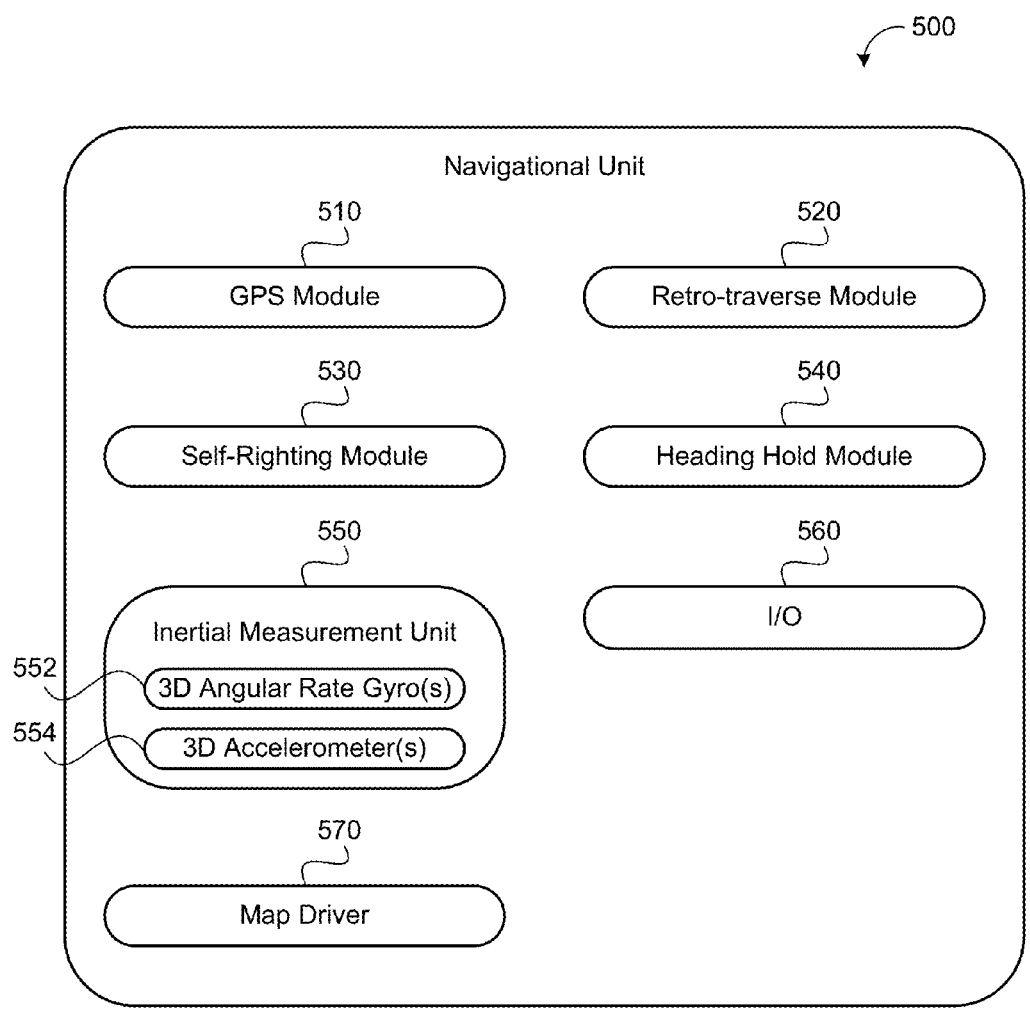
FIG. 5A is a schematic view of an exemplary navigation unit.

Referring to FIGS. 4 and 5, in some implementations, the robot 100 receives, or the controller 200 includes, a navigation unit 500. In the example shown in FIG. 4, the navigation unit 500 is mounted on the main body 110 in communication with the controller 200. The navigation unit 500 provides semi-autonomous capabilities or assistive behaviors for the robot 100 to improve situational awareness for the robot operator. For example, the robot 100 may support an assisted teleoperation behavior, which prevents the user from hitting obstacles while using on board obstacle detection/obstacle avoidance (ODOA) sensors and responsive ODOA behaviors (e.g., turn away; turn around; stop before obstacle). In another example, the navigation unit 500 may perform certain tasks for the robot operator, freeing the operator to perform other tasks and attend to operational security during a mission. The tasks performable by the navigation unit 500 may include, but not limited to, global positioning system (GPS) mapping, retro-traverse during a communications loss, self-right, and a heading hold. In the exemplary schematic shown in FIG. 5A, the navigation unit 500 includes a GPS module 510, a retro-traverse module 520, a self-righting module 530, a heading hold module 540, an inertial measurement unit (IMU) 550 and I/O 560. The retro-traverse module 520, the self-righting module 530, the heading hold module 540, in some implementations, have corresponding behaviors executable on the controller 200 for controlling one or more components or resources of the robot 100.

Referring to FIG. 6, in some implementations, the controller 200 may execute a control system 210, which includes a control arbitration system 210a and a behavior system 210b in communication with each other. The control arbitration system 210a allows applications 220 to be dynamically added and removed from the control system 210, and facilitates allowing applications 220 to each control the robot 100 without needing to know about any other applications 220. In other words, the control arbitration system 210a provides a simple prioritized control mechanism between applications 220 and the resources 230 of the robot 100.

The applications 220 can be stored in memory of or communicated to the robot 100, to run concurrently on (e.g., on a processor) and simultaneously control the robot 100. The applications 220 may access behaviors 300 of the behavior system 210b. The independently deployed applications 220 are combined dynamically at runtime and to share robot resources 230 (e.g., drive system 115, arm(s) 150, head(s) 160 and/or gripper(s) 170) of the robot 100. A low-level policy is implemented for dynamically sharing the robot resources 230 among the applications 220 at run-time. The policy determines which application 220 has control of the robot resources 230 required by that application 220 (e.g. a priority hierarchy among the applications 220). Applications 220 can start and stop dynamically and run completely independently of each other. The control system 210 also allows for complex behaviors 300 which can be combined together to assist each other.

The control arbitration system 210a includes one or more resource controllers 240, a robot manager 250, and one or more control arbiters 260. These components do not need to be in a common process or computer, and do not need to be started in any particular order. The resource controller 240 component provides an interface to the control arbitration system 210a for applications 220. There is an instance of this component for every application 220. The resource controller 240 abstracts and encapsulates away the complexities of authentication, distributed resource control arbiters, command buffering, and the like. The robot manager 250 coordinates the prioritization of applications 220, by controlling which application 220 has exclusive control of any of the robot resources 230 at any particular time. Since this is the central coordinator of information, there is only one instance of the robot manager 250 per robot. The robot manager 250 implements a priority policy, which has a linear prioritized order of the resource controllers 240, and keeps track of the resource control arbiters 260 that provide hardware control. The control arbiter 260 receives the commands from every application 220 and generates a single command based on the applications' priorities and publishes it for its associated resources 230. The control arbiter 260 also receives state feedback from its associated resources 230 and sends it back up to the applications 220. The robot resources 230 may be a network of functional modules (e.g. actuators, drive systems, and groups thereof) with one or more hardware controllers. The commands of the control arbiter 260 are specific to the resource 230 to carry out specific actions.

A dynamics model 270 executable on the controller 200 is configured to compute the center for gravity (CG), moments of inertia, and cross products of inertial of various portions of the robot 100 for the assessing a current robot state. The dynamics model 270 may be configured to calculate the center of gravity $CG_M$ of the main body 110, the center of gravity $CG_F$ of each flipper 130, the center of gravity $CG_A$ of each arm 150, the center of gravity $CG_H$ of each head 160, and/or the center of gravity CG of the entire robot 100. The dynamics model 270 may also model the shapes, weight, and/or moments of inertia of these components. In some examples, the dynamics model 270 communicates with the inertial moment unit (IMU) 550 or portions of one (e.g., accelerometers and/or gyros) in communication with the controller 200 for calculating the various center of gravities of the robot 100. The dynamics model 270 can be used by the controller 200, along with other programs 220 or behaviors 300 to determine operating envelopes of the robot 100 and its components.

Each application 220 has an action selection engine 280 and a resource controller 240, one or more behaviors 300 connected to the action selection engine 280, and one or more action models 290 connected to action selection engine 280. The behavior system 210b provides predictive modeling and allows the behaviors 300 to collaboratively decide on the robot's actions by evaluating possible outcomes of robot actions. In some examples, a behavior 300 is a plug-in component that provides a hierarchical, state-full evaluation function that couples sensory feedback from multiple sources with a-priori limits and information into evaluation feedback on the allowable actions of the robot. Since the behaviors 300 are pluggable into the application 220 (e.g. residing inside or outside of the application 220), they can be removed and added without having to modify the application 220 or any other part of the control system 210. Each behavior 300 is a standalone policy. To make behaviors 300 more powerful, it is possible to attach the output of multiple behaviors 300 together into the input of another so that you can have complex combination functions. The behaviors 300 are intended to implement manageable portions of the total cognizance of the robot 100.

The action selection engine 280 is the coordinating element of the control system 210 and runs a fast, optimized action selection cycle (prediction/correction cycle) searching for the best action given the inputs of all the behaviors 300. The action selection engine 280 has three phases: nomination, action selection search, and completion. In the nomination phase, each behavior 300 is notified that the action selection cycle has started and is provided with the cycle start time, the current state, and limits of the robot actuator space. Based on internal policy or external input, each behavior 300 decides whether or not it wants to participate in this action selection cycle. During this phase, a list of active behavior primitives is generated whose input will affect the selection of the commands to be executed on the robot 100.

In the action selection search phase, the action selection engine 280 generates feasible outcomes from the space of available actions, also referred to as the action space. The action selection engine 280 uses the action models 290 to provide a pool of feasible commands (within limits) and corresponding outcomes as a result of simulating the action of each command at different time steps with a time horizon in the future. The action selection engine 280 calculates a preferred outcome, based on the outcome evaluations of the behaviors 300, and sends the corresponding command to the control arbitration system 210a and notifies the action model 290 of the chosen command as feedback.

In the completion phase, the commands that correspond to a collaborative best scored outcome are combined together as an overall command, which is presented to the resource controller 240 for execution on the robot resources 230. The best outcome is provided as feedback to the active behaviors 300, to be used in future evaluation cycles.

Figure 7:
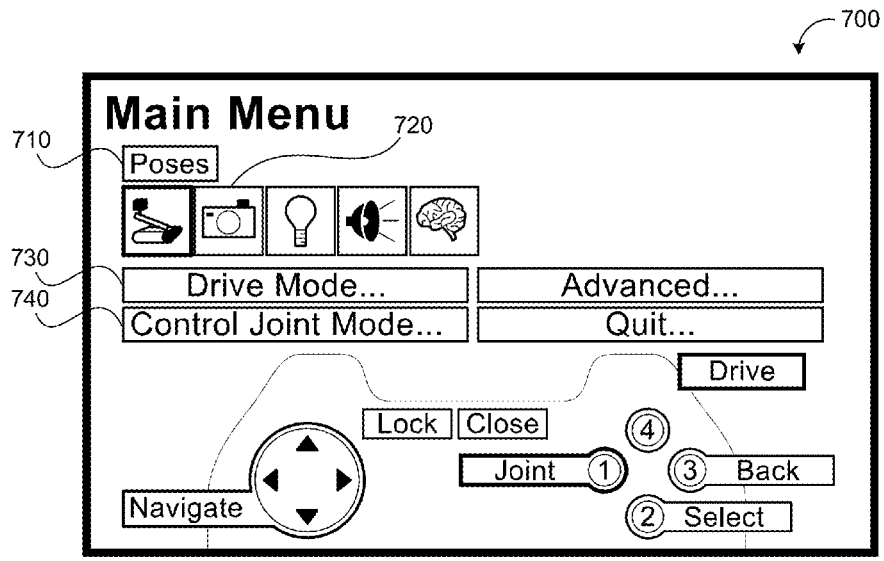
FIG. 7 is a schematic view of an exemplary main menu displayable on an operator control unit.
Figure 8:
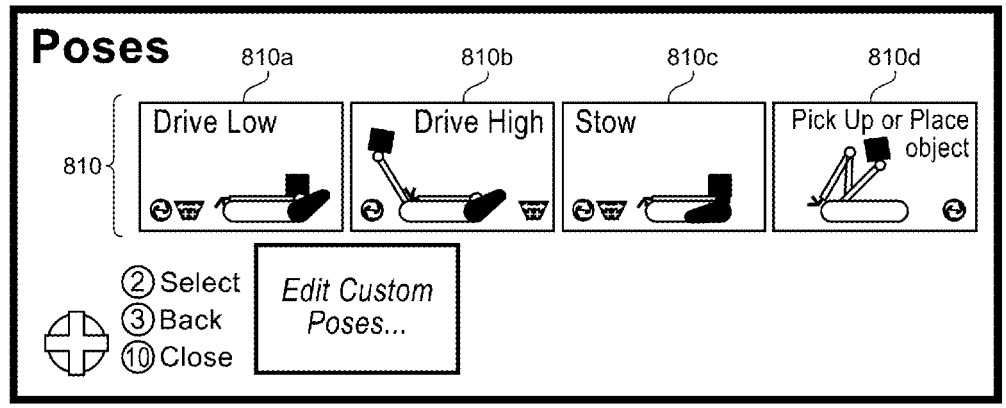
FIG. 8 is a schematic view of an exemplary poses pane displayable on an operator control unit.

Referring to FIG. 7, in some implementations, the robot operator or user may access a main menu 700 displayed on the display 410 of the OCU 400. The main menu 700 allows the user to select various features, modes, and adjust options for controlling and/or monitoring the robot 100. User selected actions can cause interactions with one or more behaviors 300 to execute the actions. In the example shown, the user can select a pose chooser 710 that displays a robot pose pane 800, such as shown in FIG. 8. The robot pose pane 800 may provide a pose list or pose collection 810 of selectable poses. After selecting a robot pose, the robot 100 assumes the selected pose. For example, using the control system 210, the controller 200 selects an action (or move command) for each robotic component (e.g., motor or actuator) from a corresponding action space (e.g., a collection of possible actions or moves for that particular component) to effectuate a coordinated move of each robotic component in an efficient manner that avoids collisions with itself and any objects about the robot 100, which the robot 100 is aware of. The controller 200 can issue a coordinated command over robot network, such as an EtherIO network, as described in U.S. Ser. No. 61/305,069, filed Feb. 16, 2010, the entire contents of which are hereby incorporated by reference.

Figure 9:
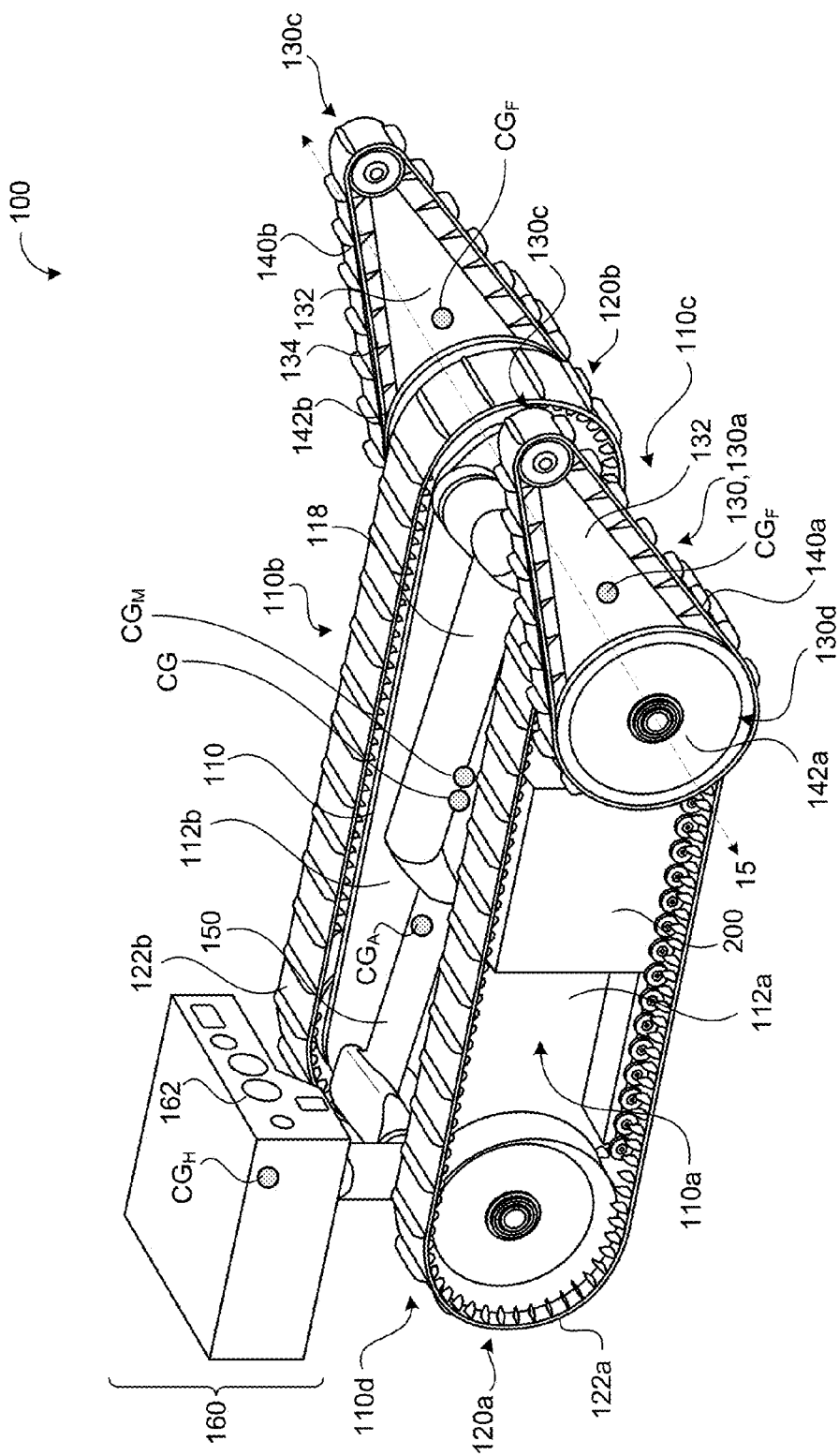
FIG. 9 is a front perspective view of an exemplary robot in a stair climbing pose.

In the example shown in FIG. 8, the pose collection 810 includes a drive low pose 810a, which moves any attached arms 150, 150a, 150b to their stowed positions along the main body 110 and the right and left flippers 130a, 130b to an incline position with respect to the ground, as shown in FIG. 9. The drive low pose 810a can also be referred to as a stair climbing pose, when a stair climbing assist behavior 300 is activated (e.g., by the user, by another behavior, or by some other means). For a robot configuration having first and second arms 150a, 150b, each having an attached head 160 and an attached gripper 170, respectively, activation of the drive low pose 810a moves the first and second arms 150a, 150b to their stowed positions along the main body 110, placing the corresponding attached head 160 and gripper 170 next the to main body 110 as well. In some examples, the robot 100 can assume also assume a stair descending preparation pose (similar to the pose shown in FIG. 9, but with the flippers 130a, 130b pointing downward) when a stair descending assist behavior is activated. The stair climbing behaviors can be configured to control (tilt) the flippers 130a, 130b and control the position of the center of gravity CG the robot 100 as the robot 100 negotiates stairs. A stair climbing assist behavior keeps the robot 100 on a straight path up stairs and, in one example, may maintain a roll angle of about zero degrees.

Referring again to FIG. 8, in some examples, the user can select a drive high pose 810b, which moves the first arm 150a to a deployed position at an angle greater than 0 degrees with respect to the main body 110. This moves the attached head 160 to a position above the main body 110, to obtain a different vantage point of the head camera 162, as shown in FIG. 2 for example. The user may select a stowed pose 810c, which moves the arm(s) 150, 160a, 150b to a stowed position next to or alongside the main body 110 (see e.g., FIG. 3) and the flippers 130a, 130b to their stowed position as well alongside the main body 110 (e.g., adjacent the side plates 112a, 112b of the main body 110). In some examples, the user can select a pick and place pose 810d, which moves the first and second arms 150a, 150b to deployed positions at an angle greater than 0 degrees with respect to the main body 110, as shown in FIG. 4. This pose places the robot 100 in a stance amenable to viewing an object with one of the cameras 118, 162, 172, grasping the object with the gripper 170, and moving the object. When grasping an object with the gripper 170, the OCU 400 may display a real-time gripping force (e.g., a measured by motor torque or motor current feedback, gripper sensors, etc.). For example, while attempting to pick up and egg using the gripper 170, the user can monitor the gripping force and, in some examples, set a maximum gripping force that the gripper 170 cannot exceed, so as to carefully pick up the egg without breaking the egg. Moreover, providing the user with gripper force feedback through the OCU 400 allows the user to determine whether a particular object was successfully grasped for transporting.

Moreover, the user can program custom poses for later assumption by the robot 100 as well. For example, the user may move the robot 100 into a particular pose and record and name the pose. The controller 200 then repopulates the pose list to include the custom pose for selection and use by the user. For example, the user may create an upright mobility pose, which causes the controller 200 to rotate the flippers 130a, 130b from a stowed position next to the main tracks 122a, 122b (or to the stowed position first and then) downward and away from the main tracks 122a, 122b, raising and supporting the main body 110 on the flippers 130a, 130b. The upright mobility position can be used to elevate the head 160 to allow the head camera 162 to view over an obstacle.

Referring again to FIG. 7, in some implementations, the user may select a camera view chooser 720 to determine one or more displayed real-time views that correspond to one or more of the cameras 118, 162, 172 on the robot 100. Moreover, the user may control a field of view and movement of each camera 118, 162, 172 to monitor various scenes about the robot 100. For example, the user may direct one or more of the cameras 118, 162, 172 to move to obtain a particular field of view and the controller 200 will determine how to move an attached arm 150 or actuator (not shown) to effectuate the directed camera move.

In some examples, the user can select a drive mode 730 or a joint control mode 740. The drive mode 730 may allow the user to monitor one or more of a location, speed, heading and camera view(s) while driving the robot 100 using the OCU 400 or the auxiliary input 430 (e.g., joystick). The joint control mode 740 may allow the user to control joint articulation of an attached arm 150. For example, the user may wish to move one joint of the arm 150 while keeping another joint fixed or rigid, to assume a particular pose for the robot 100 or to carry out a particular mission.

Figure 10A:
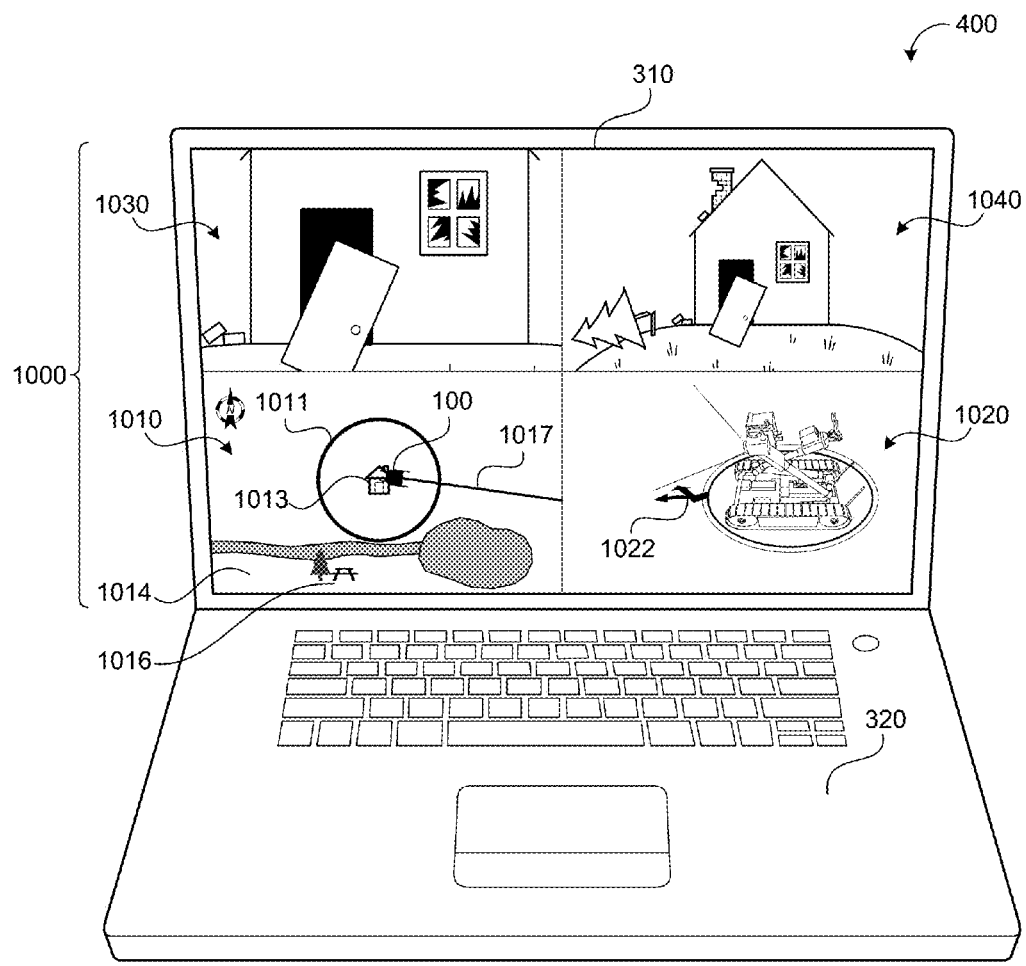
FIGS. 10A and 10B are schematic views of an exemplary operator control unit displaying a robot plan view, a situational view, and first and second camera views.
Figure 10B:
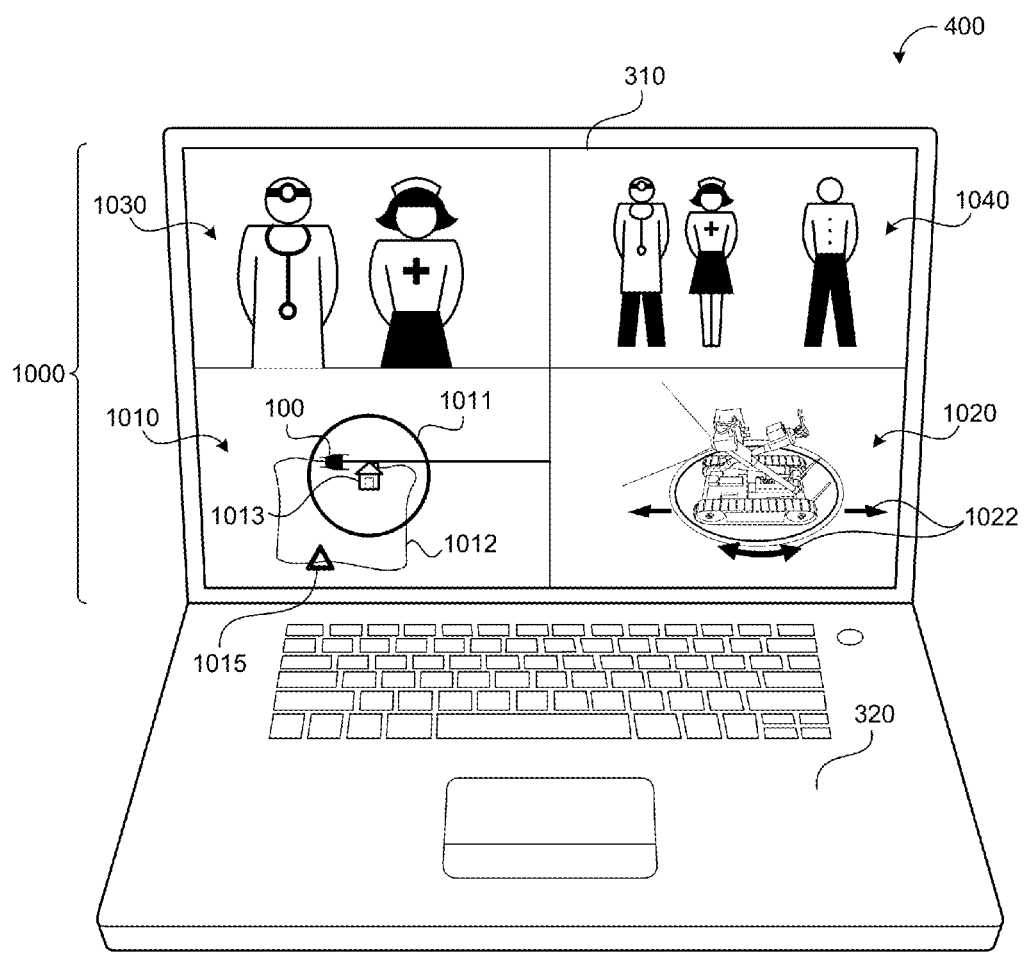

FIGS. 10A and 10B provide exemplary drive mode views 1000 on the OCU display 410. The drive mode view 1000, in some examples, provides a plan or location view 1010 of the robot 100, a situational model view 1020 of the robot 100, a first camera view 1030 (e.g., corresponding to the camera 118 on the main body (shown in the example as a forward field of view)) and a second camera view 1040 (e.g., corresponding to the head camera or the gripper camera 172). As the user issues drive commands to the robot 100 (e.g., via the keyboard 420 or the auxiliary input 430 (e.g., joystick)), the user can monitor the movement and location of the robot through the drive mode view 1010. For example, while driving the robot 100, the user can monitor a driven path 1012 of the robot 100 traced in the plan view 1010. The situational model view 1020 provides a model of a current state and pose of the robot 100. In the examples shown, the situational model view 1020 depicts the robot 100 in a pick and place pose along with drive command arrows 1022 (e.g., movement vectors or graphical representations of rotate and translate commands).

The GPS module 510 (FIG. 5A) may ascertain global positioning coordinates of the robot 100 (e.g., for GPS waypoint navigation) and/or time information from a satellite, which can be displayed on the plan view 1010. The controller 200 can receive the global positioning coordinates from the GPS unit 510 and communicate the coordinates to the OCU 400. The OCU 400 may execute a location routine that displays a map 1014 on the plan view 1010, and example of which is shown in FIGS. 10A and 10B, indicating a location of the robot 100 with respect to the map 1014. Moreover, in some examples, the GPS module 510 displays points of interest 1016 (user identified or otherwise) on the map 1014. For example, while navigating the robot 100, the user can mark points of interest 1016 on the map 1014 (e.g., after viewing a scene about the robot 100 via one or more of the cameras 118, 162, 172). If the GPS module 510 cannot communicate with or otherwise ascertained coordinates from a satellite, the navigation unit 500 can maintain the driven path 1012 of the moving robot 100 until regaining satellite communications. The navigation unit 500 may obtain position and movement information from the inertial measurement unit (IMU) 550, track odometry, and/or dead reckoning. Upon regaining satellites communications, the GPS module 510 can identify the location of the robot 100 and overlay the map 1014 on the driven path 1012 in the plan view 1010. The GPS module 510 may execute a filter algorithm to match up the recorded driven path 1012 of the robot 100 with the map 1014.

Figure 5B:
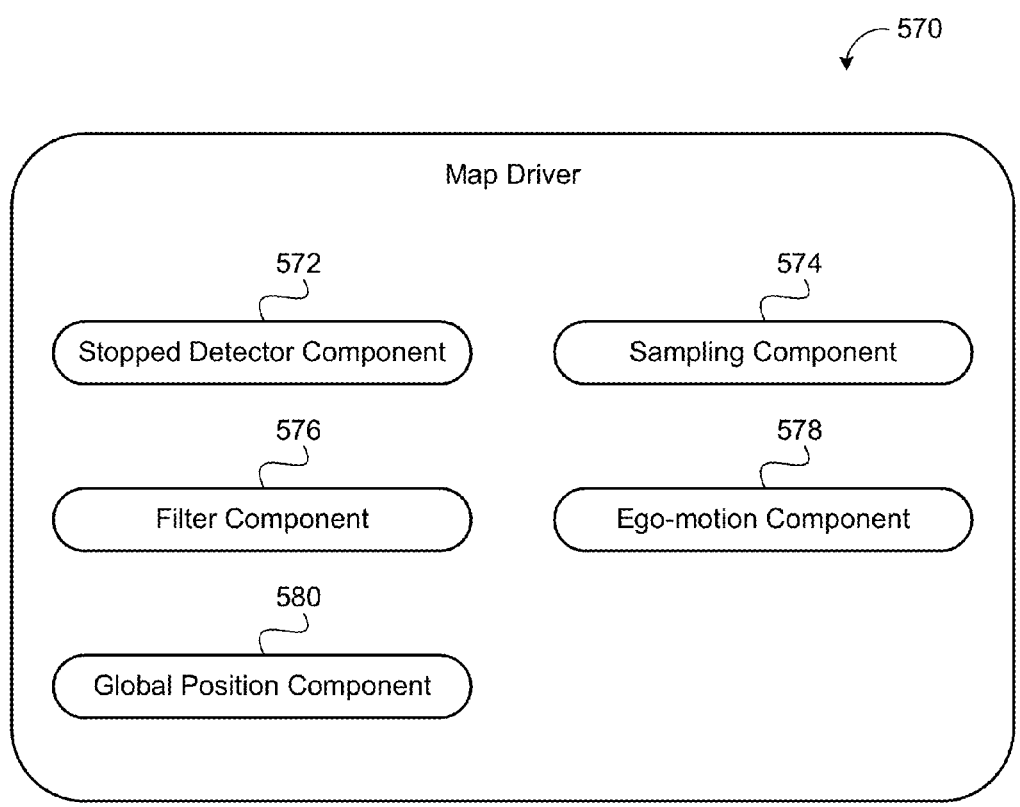
FIG. 5B is a schematic view of an exemplary map driver.

Referring to FIGS. 5A and 5B, in some implementations, a map driver 570 executable on the controller 200 (e.g., or on the navigation unit 500 in communication with the controller 200) includes a stopped detector component 572, a sampling component 574, a filter component 576, an ego-motion component 578, and a global component 580.

The map driver 570 receives data signals from three-dimensional (3D) angular rate gyro(s) 552 and 3D accelerometer(s) 554 of the inertial measurement unit (IMU) 550 as well as global positioning coordinates of the robot 100 from the GPS module 510 and track odometry. The stopped detector component 572 uses data associated with the received data signals (e.g., from the track odometry and the accelerometers of the inertial measurement unit (IMU) 550) to determine if the robot 100 is at rest. When the robot 100 is at rest, the sampling component 574 samples data from the 3D angular rate gyro(s) 552 and determines a gyro bias (drift) on the 3D angular rate gyro(s) 552. The filter component 576 determines a 3D gravity vector respect to the robot 100 using a Kalman filter on received angular rate data and accelerometer data.

Generally, a Kalman filter uses measurements that are observed over time that contain noise (random variations) and other inaccuracies, and produces values that tend to be closer to the true values of the measurements and their associated calculated values. The Kalman filter may produce estimates of the true values of measurements and their associated calculated values by predicting a value, estimating the uncertainty of the predicted value, and computing a weighted average of the predicted value and the measured value. The most weight is given to the value with the least uncertainty. The estimates produced by the method tend to be closer to the true values than the original measurements because the weighted average has a better estimated uncertainty than either of the values that went into the weighted average.

The ego-motion component 578 receives the 3D gravity vector, track odometry, gyro bias, and gyro data, subtracts the gyro bias from the gyro data, and then resolves the 3D gyro data relative to the gravity vector (to account for hills or any non-flat surface). The ego-motion component 578 then adds the angular rates from the resolved gyro data to the track odometry to produce an ego-motion estimate. The global position component 580 combines the ego-motion estimate and the global positioning coordinates of the robot 100 to produce a robot global position estimate using a particle filter. The particle filter outputs a best estimate of the robot global position, which is periodically sent to the OCU 400, which displays a line segment (e.g., depicting a driven path) connecting the consecutive robot global position estimates received by the OCU 400.

Figure 5C:
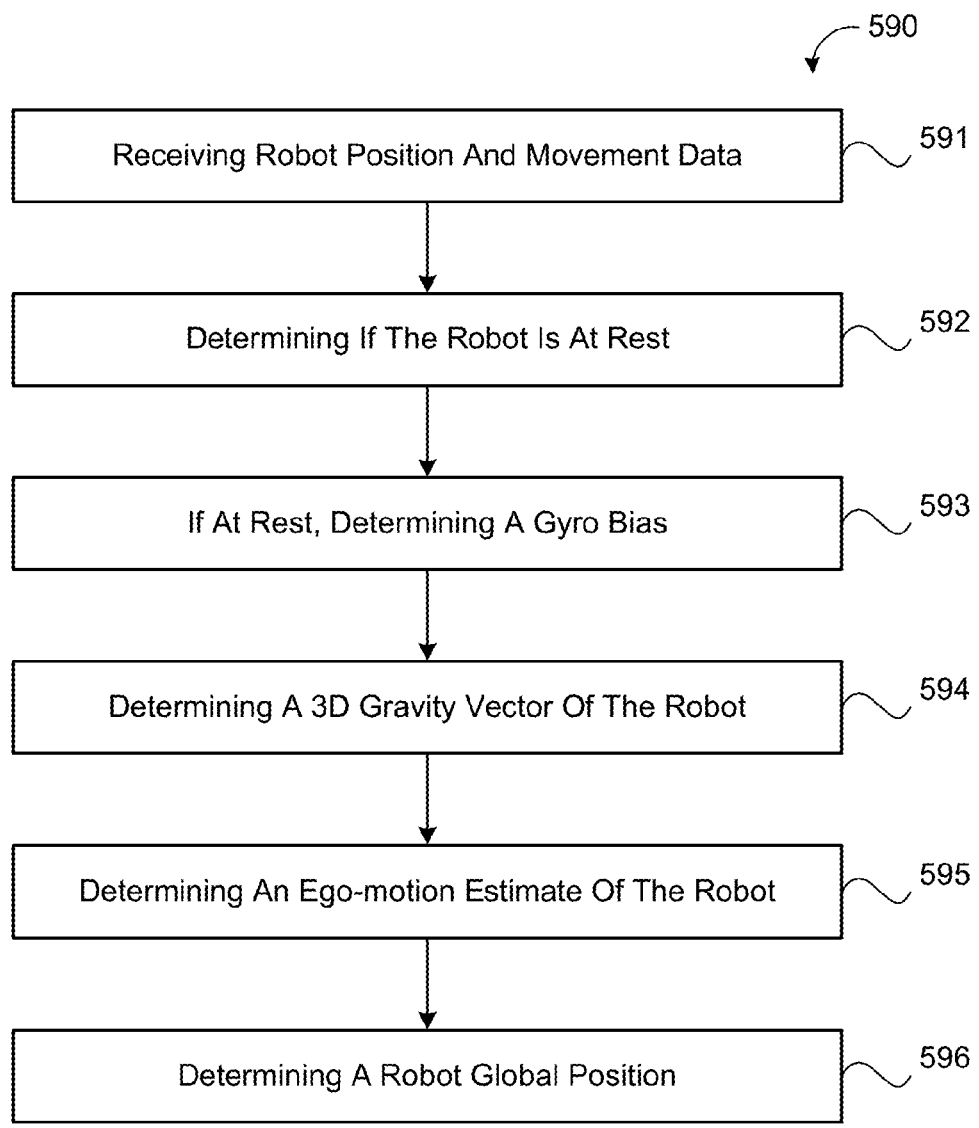
FIG. 5C is a schematic view of an exemplary arrangement of operations for determining a location of the robot.

FIG. 5C illustrates an exemplary arrangement of operations executable by the navigation unit 500 and/or controller 200 (e.g., on a processor) for determining a location of the robot 100. The operations include receiving 591 robot position and movement data, for example, a robot angular rate, a robot acceleration, robot odometry and global positioning coordinates of the robot 100. The operations further include determining 592 if the robot 100 is at rest, and if at rest, determining 593 a gyro bias (or drift). The operations include determining 594 a 3D gravity vector of the robot 100, for example, by using a Kalman filter and then determining 595 an ego-motion estimate of the robot 100, for example, by using the 3D gravity vector, odometry, gyro bias, and gyro data. The operations further include determining 596 a robot global position by combining the ego-motion estimate and the global positioning coordinates of the robot 100 using a particle filter.

Figure 11:
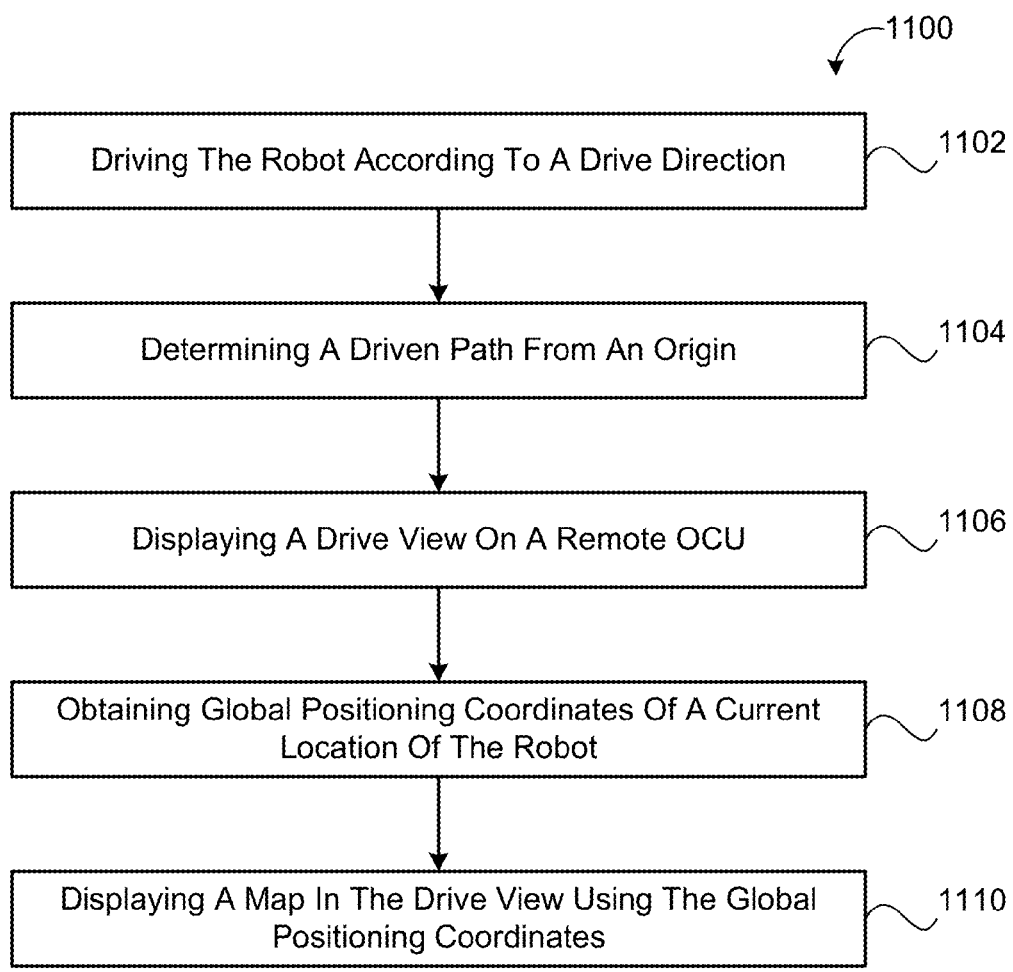
FIG. 11 provides a schematic view of an exemplary arrangement of operations for operating the robot.

FIG. 11 provides a schematic view of an exemplary arrangement 1100 of operations for operating the robot 100. The operations include driving 1102 the robot 100 according to a drive direction, determining 1104 a driven path 1012 from an origin 1013, displaying 1106 a drive view 1010 on a remote operator control unit (OCU) 400 in communication with the robot 100. The drive view 1010 shows a driven path 1012 of the robot 100 from the origin 1013. The operations further include obtaining 1108 global positioning coordinates of a current location of the robot 100 and displaying 1110 a map 1014 in the drive view 1010 using the global positioning coordinates. The driven path 1012 of the robot 100 is displayed on the map 1014. In some implementations, the operations further include at least periodically obtaining the global positioning coordinates of the current location of the robot 100 to determine the driven path 1012. The operations may include determining the driven path 1012 of the robot 100 before obtaining the global positioning coordinates and displaying the driven path 1012 in the drive view 1010. Moreover, the operations may include determining the driven path 1012 of the robot 100 during a loss of communication with a satellite for obtaining the global positioning coordinates and displaying the driven path 1012 in the drive view 1010. The driven path 1012 can be determined using at least one of an inertial measurement unit, odometry, and dead reckoning.

Figure 12:
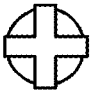
FIG. 12 is a schematic view of an exemplary assisted behaviors view displayable on an operator control unit.

FIG. 12 provides an exemplary assisted behaviors view 1200 displayable on the display 410 of the OCU 400. The assisted behaviors view 1200 may allow the user to select and execute certain behaviors 300. Referring again to FIG. 6, the behaviors 300 can be stored in memory on the controller 200, such as an assisted teleoperation behavior 300a in the example shown, and/or accessed from the navigation unit 500, such as the retro-traverse behavior 300b, the self-righting behavior 300c, and the heading hold behavior 300d. In some examples, behaviors 300 of the navigation unit 500 are accessed directly from memory of the navigation unit 500 and/or communicated from the navigation unit to and stored in memory of the controller 200.

The assisted teleoperation behavior 300a executable on the control system 210 is configured to prevent an operator from maneuvering the robot 100 into obstacles. The assisted teleoperation behavior 300a receives inputs from obstacle detection and obstacle avoidance sensors (e.g., front and rear proximity sensors disposed on the main body 110) and evaluates an outcome of the current robot command. The assisted teleoperation behavior 300a causes the robot 100 to institute obstacle avoidance measures (e.g., stop or turn away from obstacles) before the robot 100 reaches the obstacle. An obstacle is a physical or non-physical impediment that interferes with the proper functioning of the robot. Obstacles include physical objects, cliffs, adverse localized environmental conditions (e.g. hot temperature spot or high radiation area), etc. In some implementations, the assisted teleoperation behavior 300a is disabled for manual override control of the robot's resources (e.g., flippers 130, arms 150, etc.).

In the example shown in FIG. 12, the user set the retro-traverse behavior 300b and the self-righting behavior 300c to be active during a loss of communications event. The assisted behaviors 300 may be deactivated when the robot 100 is within a non-assist area 1011 about the user (FIGS. 10A and 10B), so as to prevent unsafe situations about the user. In the plan view 1010, the user area 1011 is shown centered about a location 1013 of the OCU 400 (presumably in the control of the user). As the robot 100 moves away from the OCU 400 and out of the non-assist area 1011, the assisted behaviors 300 become operational. The user may specify additional non-assist areas 1011 through the OCU 400, for example, about known areas populated by personnel.

Figure 13:
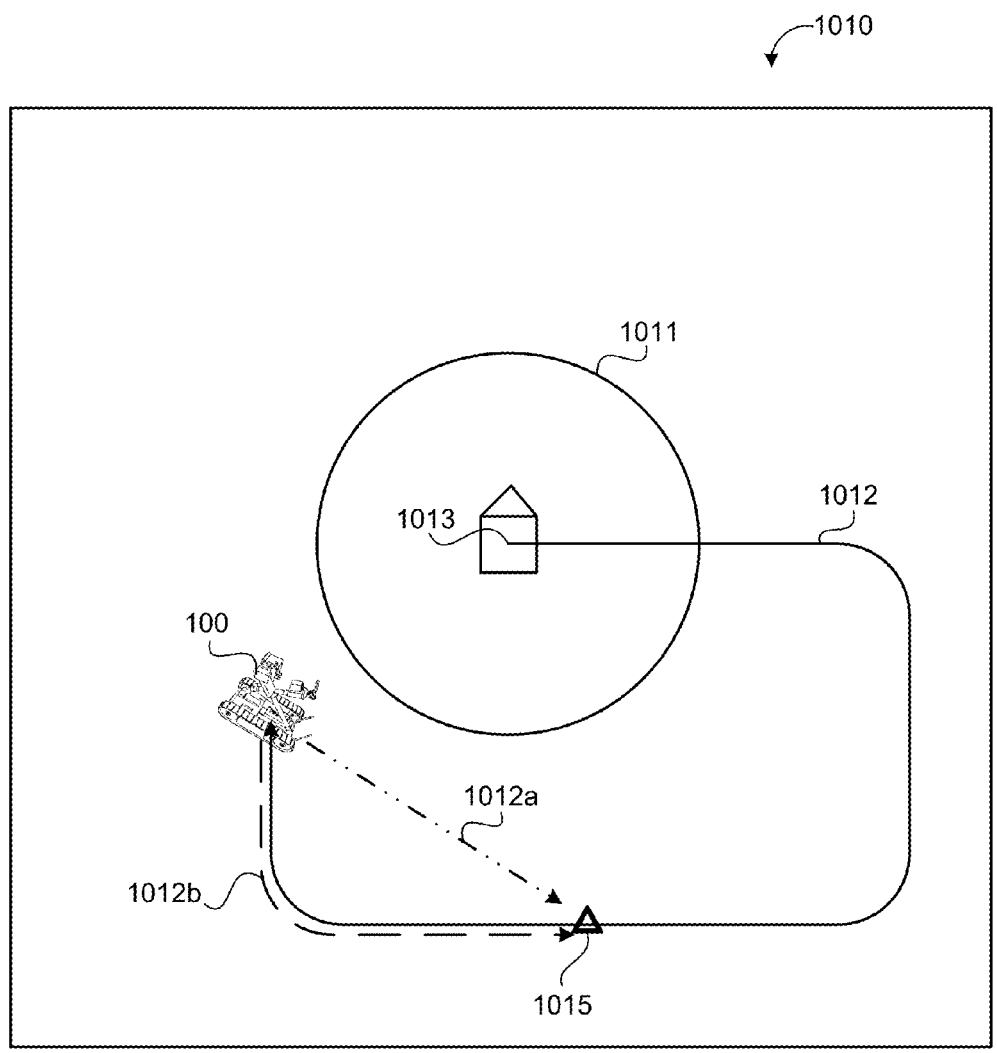
FIGS. 13 and 14 are schematic views of exemplary plan views illustrating a robot executing a retro-traverse behavior.

The retro-traverse behavior 300b places the robot 100 into an autonomous or semiautonomous mode upon losing communications with the OCU 400. In the example shown, a loss of communications occurred at point 1015 along the driven path 1012 recorded by the navigation unit 500. After a threshold period of time (e.g., 60 seconds) of experiencing the loss of communications with the OCU 400, the retro-traverse behavior 300b executes a retro-traverse routine to return to the point 1015 at which the robot 100 last had communications with the OCU 400. Referring to FIG. 13, an exemplary plan view 1010, if the GPS module 510 can obtain global positioning coordinates from a satellite, the retro-traverse behavior 300b, in some implementations, issues commands to the drive system 115 to maneuver back along the driven path 1012, as a re-traversed driven path 1012b or a new direct path 1012a according to the global positioning coordinates to the point 1015 of last communications. If the GPS module 510 cannot obtain global positioning coordinates from a satellite, the retro-traverse behavior 300b, in some implementations, issues commands to the drive system 115 to maneuver back along the driven path 1012 using measurements recorded by the IMU 550, track odometry, and/or dead reckoning. The retro-traverse behavior 300b may instruct the camera(s) 118, 162, 172 to return to a default position (e.g., having a forward or rearward field of view).

Figure 14:
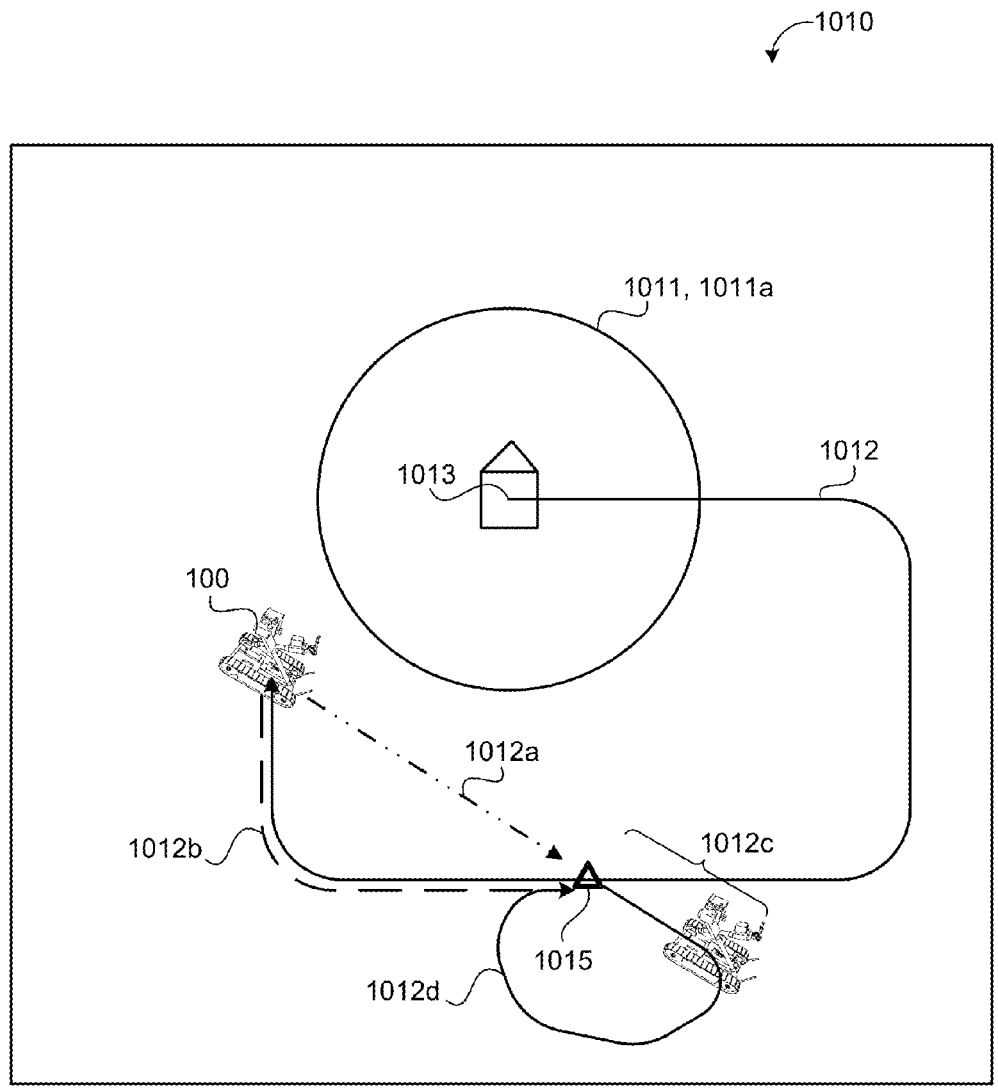

Referring to FIG. 14, an exemplary plan view 1010, while traversing back along the driven path 1012, if the robot 100 overshoots the point 1015 of last communications, the retro-traverse behavior 300b may instruct the drive system 115 to traverse only the portion of the driven path 1012c that progressed past the point 1015 of last communications, rather than re-traversing the entire driven path 1012 recorded since the loss of communications. In some implementations, as the robot 100 moves back along the recorded driven path 1012, the retro-traverse behavior 300b removes the retro-traversed path 1012b from the recorded driven path 1012 of the navigation unit 500. Consequently, after overshooting the point 1015 of last communications, the recorded driven path 1012 no longer includes the retro-traversed path 1012b back to the point 1015 of last communications and includes a new traversed path 1012c of the robot back away from the point 1015 of last communications, which can be retro-traversed by the robot 100 using the retro-traverse behavior 300b or the retro-traverse behavior 300b can determine a new best path 1012d back to the point 1015 of last communications.

In some implementations, the user may set a keep-out area 1011 a that the robot 100 cannot enter while executing a retro-traverse routine. For example, the user may set a keep-out area 1011 a around the OCU 400 and/or other operational locations or hazards. The keep-out area 1011a may be the same area as the non-assist area 1011.

Figure 15:
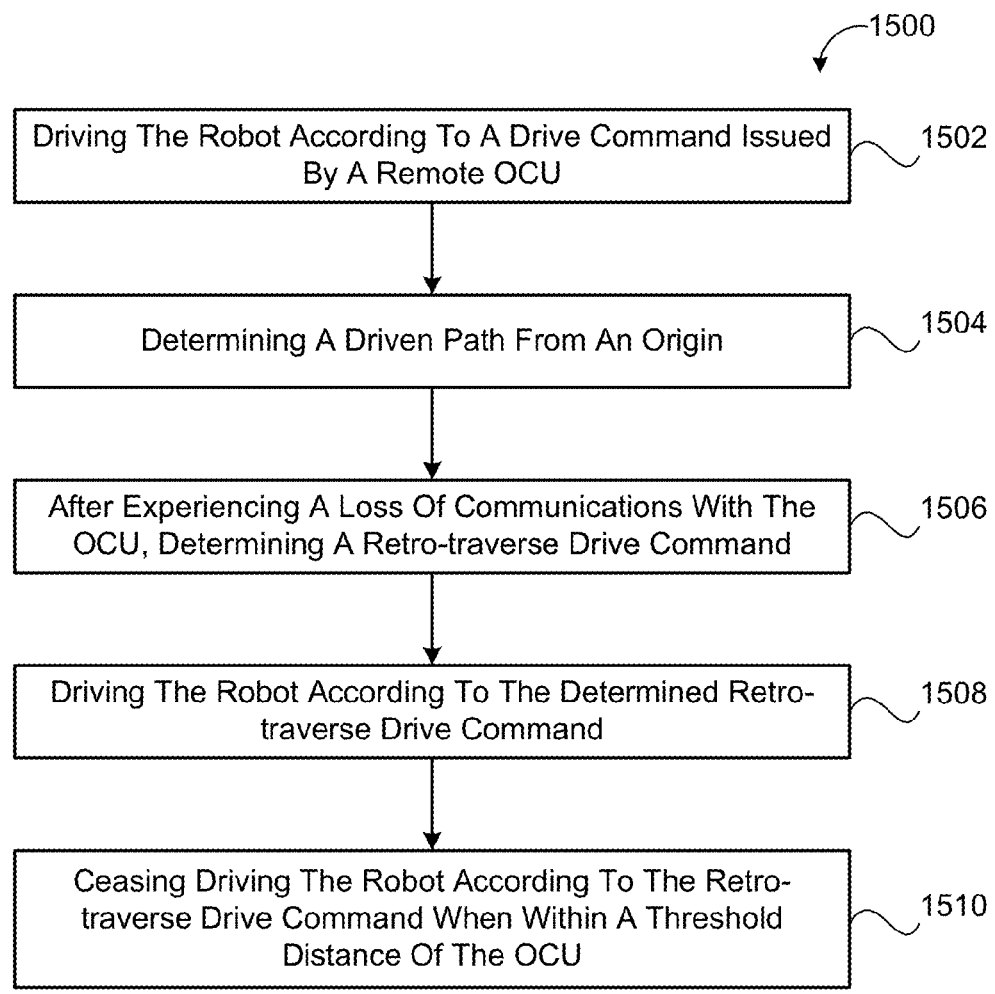
FIG. 15 provides a schematic view of an exemplary arrangement of operations for operating the robot using a retro-traverse behavior.

FIG. 15 provides a schematic view of an exemplary arrangement 1500 of operations for operating the robot 100 using the retro-traverse behavior 300b. The operations include driving 1502 the robot 100 according to a drive command issued by a remote operator control unit (OCU) 400 in communication with the robot 100, determining 1504 a driven path 1012 of the robot 100 from an origin 1013, and after experiencing a loss of communications with the OCU 400, determining 1506 a retro-traverse drive command to maneuver the robot 100 along a return path 1012a, 1012b back to a communication location 1015 where the robot 100 had established communications with the OCU 400. The operations further include driving 1508 the robot 100 according to the determined retro-traverse drive command. In some implementations, the operations further include ceasing 1510 driving the robot 100 according to the determined retro-traverse drive command when the robot 100 is within a threshold distance of the OCU 400. The operations may include at least periodically obtaining global positioning coordinates of a current location of the robot 100 to determine the driven path 1012. The return path 1012a, 1012b back to the communication location 1015 may coincide at least in part with a portion of the driven path 1012. Moreover, the operations may include storing the determined driven path 1012 in memory (e.g., of the controller 200) and continuously removing a portion of the determined driven path 1012 from the memory corresponding to the return path 1012a, 1012b back to the communication location 1015.

The self-righting behavior 300c places the robot into an autonomous or semiautonomous mode upon experiencing a robot flip-over (e.g., as detected by the IMU 550) to self-right the robot 100. The self-righting behavior 300c may execute a self-righting routine, which issues commands to the drive system 115 and/or one or more attached arms 150 to move in a manner that places the robot 100 in an upright position. For example, if the drive system 115 includes flippers 130, 130a, 130b, the self-righting module 530 may instruct the flippers 130, 130a, 130b to rotate from the stowed position next to the main tracks 122a, 122b downward and away from the main tracks 122a, 122b, raising and supporting the main body 110 on the flippers 130a, 130b, and then further rotate the flippers 130a, 130b to drive the upright main body 110 past a vertical position, causing the robot 100 to fall over and thereby invert the main body 110. If any arms 150 are attached to the main body 110, the self-righting module 530 may move the arms 150 to place of their respective center gravities $CG_A$ (and the center of gravity $CG_H$ of any attached head(s) 160) in positions that maintain the overall center of gravity CG of the robot 100 within an envelope of the 360 degree rotation of the flippers 130a, 130b.

Figure 16:
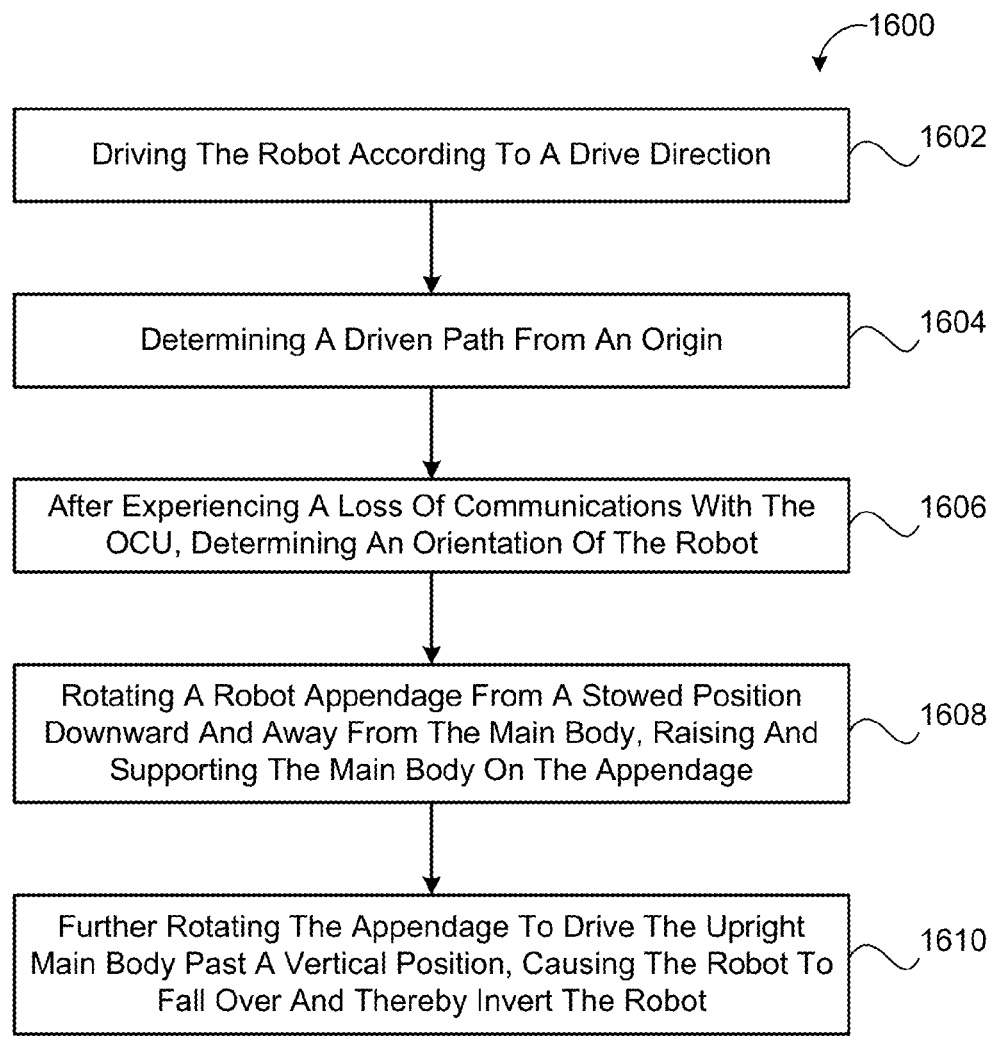
FIG. 16 provides a schematic view of an exemplary arrangement of operations for operating the robot using a self-righting behavior.

FIG. 16 provides a schematic view of an exemplary arrangement 1600 of operations for operating the robot 100 using the self-righting behavior 300c. The operations include driving 1602 the robot 100 according to a drive command issued by a remote operator control unit (OCU) 400 in communication with the robot 100, determining 1604 a driven path 1012 of the robot 100 from an origin 1013, and after experiencing a loss of communications with the OCU 400, determining 1606 an orientation of the robot 100. The operations include executing 1608 a self-righting maneuver when the robot 100 is oriented upside down. The self-righting maneuver includes rotating 1608 an appendage of the robot (e.g., at least one flipper 130) from a stowed position along side a main body 110 of the robot 100 downward and away from the main body 110, raising and supporting the main body 110 on the appendage 130, and then further rotating 1610 the appendage 130 to drive the upright main body 110 past a vertical position, causing the robot 100 to fall over and thereby invert the main body 110. In some examples, the appendage includes at least one flipper 130 rotatably mounted near one end of the main body 110 of the robot 100. The at least one flipper 130 is rotatable in a continuous 360 degrees with respect to the main body 110. Moreover, the operations may include moving each arm 150 attached to the main body 110 to place its respective center gravity $CG_A$ in a position that maintain an overall center of gravity CG of the robot 100 within the envelope of the 360 degree rotation of the at least one flipper 130.

The heading hold behavior 300d provides an assistant behavior that allows the robot 100 correct a heading 1017 (FIG. 10A) of the driven robot 100. For example, if the robot 100 hits a rock, obstacle, or course variation while driving in veers off course, the heading hold behavior 300d can automatically correct the heading 1017 of the robot 100, allowing the robot 100 to maintain a drive direction issued by the user. In some examples, the auxiliary input 430 (e.g., joystick) can have a left-to-right dead band for steering the robot 100. Using the heading hold behavior 300d, the user can set a drive direction or heading 1017 and select the heading hold behavior 300d to maintain that drive direction or heading 1017. While initiating a drive or driving in an arced path, the heading hold behavior 300d may determine an project the arced heading 1017 on the plan view 1010. The user can elect to allow the heading hold behavior 300d to follow the determined arced heading 1017 or drive along a different path.

Figure 17:
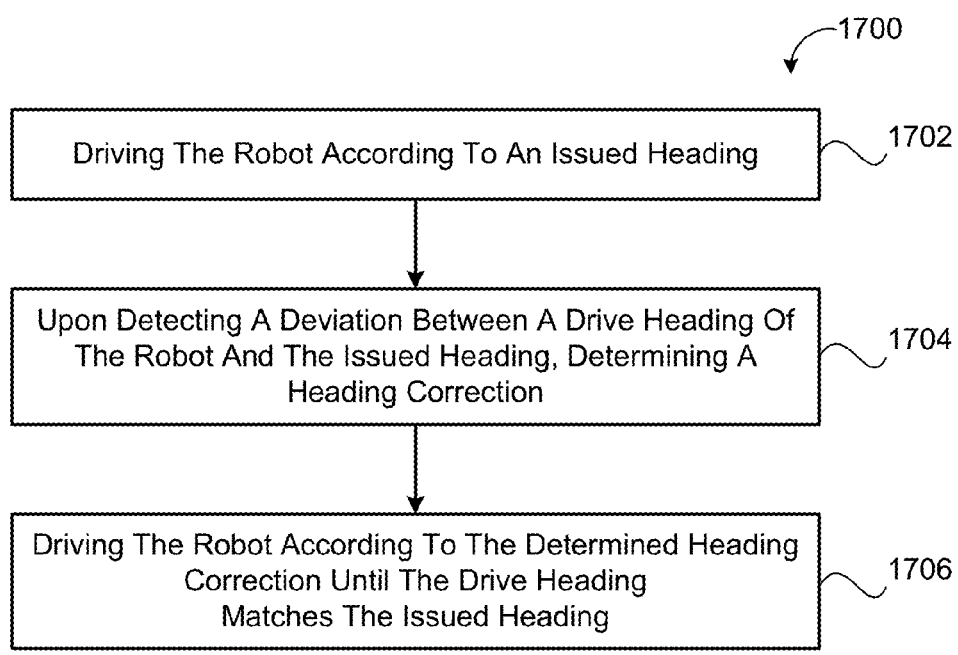
FIG. 17 provides a schematic view of an exemplary arrangement of operations for operating the robot using a heading hold behavior.

FIG. 17 provides a schematic view of an exemplary arrangement 1700 of operations for operating the robot 100 using the heading hold behavior 300d. The operations include driving 1702 the robot according to a heading 1017 issued by the OCU 400 in communication with the robot 100, and upon detecting a deviation between a drive heading of the robot and the issued heading 1017, determining 1704 a heading correction. The operations further include driving

1706 the robot 100 according to the determined heading correction until the drive heading matches the issued heading 1017.

In some implementations, the controller 200 and/or the OCU 400 allows the user to move the head 160 and/or the gripper 170 to precise locations without having to control each individual joint of the respective arm 150, 150a, 150b. For example, when the user instructs the head 160 to move straightforward, the controller 200 and/or the OCU 400 determines the arm joint movements necessary to move ahead 160 in Cartesian space (e.g., using inverse kinematics). The control system 210 determines a number of feasible commands and selects the command having the best outcome to carry out the user command. In other words, the control system 210 generates a number of feasible commands using the dynamics model 270 and action model(s) 290 and selects the command that will cause the head 160 to move in the manner commanded by the user (e.g., straight forward in Cartesian space, straight down, etc.).

A system for allowing an operator to switch between remote vehicle teleoperation and one or more remote vehicle autonomous behaviors is described in U.S. Patent Application Publication 2009/0037033, filed Feb. 5, 2009; U.S. Patent Application Publication 2008/0086241, filed Apr. 10, 2008; and U.S. Patent Application Publication 2008/0027590, filed Jan. 31, 2008, the entire contents of these publications are hereby incorporated by reference. Various features disclosed in the aforementioned publications are combinable with features disclosed herein. For example, the aforementioned system can be implemented in the disclosed mobile robot 100 to provide an operator control unit (OCU) 400 capable of receiving an input from the operator including instructions for executing an autonomous behavior that uses input from the GPS module 510, the inertial measurement unit (IMU) 550, and a navigation CPU of the navigation unit 500.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

Implementations of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular implementations of the invention. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. A method of operating a mobile robot, the method comprising:
    driving the robot according to a drive command issued by a remote operator control unit in communication with the robot;
    determining a driven path from an origin;
    after experiencing a loss of communications with the operator control unit, determining an orientation of the robot; and
    executing a self-righting maneuver when the robot is oriented upside down, the self-righting maneuver comprising:
        rotating an appendage of the robot from a stowed position alongside a main body of the robot downward and away from the main body, raising and supporting the main body on the appendage, and then
        further rotating the appendage to drive the upright main body past a vertical position, causing the robot to fall over and thereby invert the main body, wherein the appendage comprises at least one flipper rotatably mounted near one end of the main body of the robot, the at least one flipper rotatable in a continuous 360 degrees with respect to the main body.

2. The method of claim 1, further comprising moving the at least one flipper to place a center gravity of the at least one flipper in a position that maintains an overall center of gravity of the robot within an envelope of the 360 degree rotation of the at least one flipper.

3. The method of claim 1, wherein the at least one flipper comprises right and left flippers disposed on corresponding right and left sides of the main body, each flipper having a distal end, a pivot end pivotally coupled near the one end of the main body of the robot, and a flipper center of gravity between the distal and pivot ends, and wherein movement of the flippers alters a location of an overall center of gravity of the robot.

4. The method of claim 3, further comprising rotating the right and left flippers in unison or independently from each other.

5. The method of claim 1, wherein the at least one flipper comprises a flipper track support and driven track trained about the flipper track support.

6. The method of claim 1, further comprising:
    receiving gyro data; and
    determining the orientation of the robot using the gyro data.

7. The method of claim 1, wherein determining the orientation of the robot comprises:
    receiving data signals from at least one three-dimensional angular rate gyro of the robot and/or at least one three-dimensional accelerometer of an inertial measurement unit of the robot; and
    determining a three-dimensional gravity vector of the robot based on the received data signals.

8. The method of claim 7, further comprising using a Kalman filter to determine the three-dimensional gravity vector of the robot.

9. The method of claim 1, further comprising:
    determining a retro-traverse drive command after experiencing the loss of communications with the operator control unit to maneuver the robot along a path back to a communication location where the robot had established communications with the operator control unit; and driving the robot according to the retro-traverse drive command.

10. The method of claim 9, wherein the path back to the communication location coincides at least in part with a portion of the driven path from the origin.

11. The method of claim 1, further comprising at least periodically obtaining global positioning coordinates of a current location of the robot to determine the driven path.

12. The method of claim 1, wherein determining the driven path from the origin comprises:
receiving robot position and movement data comprising:
gyro data of the robot including a robot angular rate and a robot acceleration;
drive odometry of the robot; and
global positioning coordinates of the robot obtained from satellite communications;
when the robot is at rest, determining a gyro bias based on the gyro data;
determining a three-dimensional gravity vector of the robot based on the gyro data;
determining an ego-motion estimate of the robot by:
subtracting the gyro bias from the gyro data;
resolving the gyro data relative to the three-dimensional gravity vector; and
adding angular rates from the resolved gyro data to the drive odometry of the robot;
when the satellite communications used to obtain the global positioning coordinates of the robot are available, determining a robot global position by combining the ego-motion estimate and the global positioning coordinates of the robot;
when the satellite communications used to obtain the global positioning coordinates of the robot are unavailable, determining the robot global position of the robot based on at least one of the gyro data, the drive odometry, or dead reckoning.

13. A method of operating a mobile robot, the method comprising:
driving the robot according to a drive command issued by a remote operator control unit in communication with the robot;
determining a driven path from an origin;
after experiencing a loss of communications with the operator control unit, determining an orientation of the robot; and
executing a self-righting maneuver when the robot is oriented upside down, the self-righting maneuver comprising:
rotating an appendage of the robot from a stowed position alongside a main body of the robot downward and away from the main body, raising and supporting the main body on the appendage, and then
further rotating the appendage to drive the upright main body past a vertical position, causing the robot to fall over and thereby invert the main body, wherein the appendage comprises:
an arm having a pivot end and a distal end, the pivot end pivotally coupled to the main body; and
a head mounted on the distal end of the arm.

14. A method of operating a mobile robot, the method comprising:
driving the robot according to a drive command issued by a remote operator control unit in communication with the robot;
determining a driven path from an origin;
after experiencing a loss of communications with the operator control unit, determining an orientation of the robot; and
executing a self-righting maneuver when the robot is oriented upside down, the self-righting maneuver comprising:
rotating an appendage of the robot from a stowed position alongside a main body of the robot downward and away from the main body, raising and supporting the main body on the appendage, and then
further rotating the appendage to drive the upright main body past a vertical position, causing the robot to fall over and thereby invert the main body, wherein the appendage comprises:
an arm having a pivot end and a distal end, the pivot end pivotally coupled to the main body; and
a gripper mounted on the distal end of the arm.

* * * * *